(12) United States Patent
Kemp

(10) Patent No.: US 9,070,103 B2
(45) Date of Patent: Jun. 30, 2015

(54) ELECTRONIC MANAGEMENT AND DISTRIBUTION OF LEGAL INFORMATION

(75) Inventor: Richard Douglas Kemp, Pennington, NJ (US)

(73) Assignee: THE BUREAU OF NATIONAL AFFAIRS, INC., Arlington, VA (US)

( * ) Notice: Subject to any disclaimer, the term of this patent is extended or adjusted under 35 U.S.C. 154(b) by 1778 days.

(21) Appl. No.: 10/603,207

(22) Filed: Jun. 25, 2003

(65) Prior Publication Data
US 2004/0024775 A1 Feb. 5, 2004

Related U.S. Application Data

(60) Provisional application No. 60/392,061, filed on Jun. 25, 2002.

(51) Int. Cl.
*G06F 17/30* (2006.01)
*G06Q 10/10* (2012.01)

(52) U.S. Cl.
CPC .......... *G06Q 10/10* (2013.01); *G06F 17/30011* (2013.01)

(58) Field of Classification Search
USPC .................................. 707/3, 10, 100, 104.1
See application file for complete search history.

(56) References Cited

U.S. PATENT DOCUMENTS

| | | | |
|---|---|---|---|
| 5,317,729 A | 5/1994 | Mukherjee et al. |
| 5,414,838 A | 5/1995 | Kolton et al. |
| 5,544,352 A | 8/1996 | Egger |
| 5,740,549 A | 4/1998 | Reilly et al. |
| 5,794,236 A | 8/1998 | Mehrle |
| 5,819,273 A | 10/1998 | Vora et al. |
| 5,864,871 A | 1/1999 | Kitain et al. |
| 5,946,682 A | 8/1999 | Wolfe |
| 5,987,454 A | 11/1999 | Hobbs |
| 6,012,055 A | 1/2000 | Campbell et al. |
| 6,014,662 A | 1/2000 | Moran et al. |
| 6,025,844 A | 2/2000 | Parsons |

(Continued)

FOREIGN PATENT DOCUMENTS

WO      WO 01/37178      5/2001

OTHER PUBLICATIONS

Frey et al. "Monitoring the News: a TDT demonstration system", Center for Intellegent Retrieval, Dept. of Comp. Sci., Univ. of Massachusetts, Amherst, MA, pp. 1-5, 2001.

(Continued)

*Primary Examiner* — Khanh Pham
(74) *Attorney, Agent, or Firm* — Jon E. Gordon; Frommer Lawrence & Haug LLP

(57) ABSTRACT

The invention provides systems, methods, and computer programs for fulfilling requests from users wanting current information related to legal or other topics designated by the users from lists of available topics. Information related to available topics is classified by type, and at least two types of information related to the designated topic(s) and/or type(s) are provided to the user. Optionally the information, when provided, is displayed on a computer display, or provided in other physical or electronic form, and is sorted according to the type or class of information to which the information belongs. The invention also provides for the gathering and making available of such information, and for the automatic updating of information in the selected legal or other professional topic(s) without intervention by the user on a periodic and/or continual basis.

5 Claims, 18 Drawing Sheets

(56) References Cited

U.S. PATENT DOCUMENTS

| | | | |
|---|---|---|---|
| 6,026,388 | A | 2/2000 | Liddy et al. |
| 6,091,412 | A | 7/2000 | Simonoff et al. |
| 6,263,351 | B1 | 7/2001 | Wolfe |
| 6,279,001 | B1 | 8/2001 | DeBettencourt et al. |
| 6,523,022 | B1* | 2/2003 | Hobbs ............... 707/3 |
| 6,839,707 | B2* | 1/2005 | Lee et al. ............. 707/8 |
| 6,938,168 | B1* | 8/2005 | Gomez et al. ........... 726/5 |
| 2002/0019741 | A1 | 2/2002 | Heston |
| 2002/0078091 | A1 | 6/2002 | Vu et al. |
| 2003/0009564 | A1* | 1/2003 | Eckel ............. 709/227 |
| 2003/0112270 | A1* | 6/2003 | Newell et al. ........... 345/738 |
| 2006/0253449 | A1* | 11/2006 | Williamson et al. ......... 707/9 |

OTHER PUBLICATIONS

Allan et al. "Temporal Summaries of News Topics", Center for Intellegent Retrieval, Dept. of Comp. Sci., University of Massachusetts, Amherst, MA, pp. 10-18, Sep. 12, 2007.

Radev, "Topic Shift Detection—Finding New Information in Threaded News", Dept. of Comp. Science, Coumbia University, New York, NY pp. 1-11, 1999.

Maria et al. "Theme-based Retrieval of Web News", DI/FCUL, FAculdade de Ciencias, Universidade de Lisboa, Campo Grande, Lisboa, Portugal, pp. 1-6, May 18, 2000.

* cited by examiner

```
                                                    110n Govt NSN
<MENU> to return to headlines
This story has an attachment. 97 <GO>  to view.
SearchT[        ][GO][ Attachment ][ Options ▼][ Related Info ▼]   BL  Apr 5 2002  17:23

Ballenger v. Applied Digital Solutions, Inc. (Del. Ch.)            Page 1/2
Ballenger v. Applied Digital Solutions, Inc., C.A. No. 01-390GMS  (Del. Ch.,
Jan. 31, 2002)

CASE DIGEST
History: None.
Summary: Defendant company, Applied Digital Solutions, filed a motion to
dismiss plaintiff stockholders' compliant alleging that defendant breached its
contract with plaintiffs, under which defendant promised to use its best
efforts to register defendant's stock which defendant gave to plaintiffs in
exchange for plaintiffs' stock in Compec, a telecommunication company, and
breached the implied covenant of good faith and fair dealing when its failed to
make promised earnout payments to plaintiffs. Plaintiffs' complaint further
alleged that the defendant had violated the Securities Act of 1933, Sec., 15
U.S.C. Sec. 77e by failing to register the stock it gave to the plaintiffs. The
federal district court, agreeing with the defendant's contention that the
statute of limitations ran on plaintiffs' Securities Act claim because the
defendant's stock had been first bona fide offered to the public over seven
years ago, dismissed plaintiffs' Securities Act claim as time barred. The court
further stated that, although it had discretion in deciding whether or not to
dismiss claims over which it did not have original jurisdiction but rather
supplemental jurisdiction after it had dismissed claims over which it had
                                                    Copyright 2002 Bloomberg L.P.
```

ELECTRONIC MANAGEMENT AND DISTRIBUTION OF LEGAL INFORMATION

RELATED APPLICATION

This application claims the benefit of U.S. Provisional Application Ser. No. 60/392,061, filed Jun. 25, 2002 and entitled ELECTRONIC MANAGEMENT AND DISTRIBUTION OF LEGAL INFORMATION.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention provides methods and systems for providing and monitoring information over a communication network. In particular, the invention provides methods and systems for computerized researching in and monitoring of legal and other professional subjects.

Computerized legal research tools such as Westlaw and Lexis provide searchable archival databases of statutes, administrative rules, judicial decisions, and secondary materials such as law journal articles and the like, and present search results on monitors in linked screen display progressions. Such systems do not provide, however, efficient systems for the continuous monitoring of developments, particularly in individual identified topics. Such systems do not provide, for example, push systems wherein a system user is automatically provided with updates, news, and other developments in their topics of interest.

BRIEF SUMMARY OF THE INVENTION

The invention provides methods and systems for processing information for inclusion in, and providing to users, automated current awareness services in professional fields such as medicine, the various scientific and technical disciplines, and particularly the legal field.

For example, the invention provides systems, methods, and computer programs and program products for fulfilling requests from users of current awareness systems for information related to legal topics designated by the requesters from a list of available legal topics. Information related to available topics is classified by type, and at least two types of information related to the designated topic(s) are provided to the requester. Preferably the information, when provided, is displayed on a computer display, or provided in accordance with a designation by the requester in printed, emailed, or other form, and is sorted according to the topic(s) and type(s) or class(es) of information to which the information belongs.

The invention also provides for automatic updating of information in the selected legal or other professional topic(s) without further action by the requester. For example, the invention provides methods, systems, programming, and program product for providing to a computer or other device, such as a memory, display, or other output device designated by a requester, a plurality of different types of legal information relating to one or more legal topics, and displaying the information simultaneously in different parts of the display, or otherwise providing the information in tabulated form to the requester, while automatically updating the information as, for example, new information items are received by or taken into the system. Preferably the information provided in response to the request is sorted in the display or other output format according to topic, type or class, or both. Optionally, updates are provided on a periodic and/or continual basis. Thus the invention comprises, for example, using push and/or automatic pull technology in methods which include re-accessing information databases in response to user requests for information on an automatic basis, checking the databases for information received in requested topics and classifications since the time of the last delivery of information to the user and, if new information is present, providing new information responsive to the request.

In some embodiments, information provided by the system to the requesting user is displayed in a separate display window on a computer screen for each type or class of information. For example, where information related to a legal topic such as "securities" or "corporate" law is requested, and the responsive information is classified into types, including for example judicial decisions, statutes, administrative rules, and administrative decisions, a separate window is presented for each classification: one for judicial decisions, one for statutes, etc. Optionally types can also include other classes of information, as for example source(s) of information and dates associated with the information. Information from the database fitting into each type is displayed in its corresponding window.

Information can also be provided in tabulated form for printing, by e-mail, facsimile, or in digital form for other volatile or non-volatile memory storage. Information is provided in tabulated form when it is sorted, placed in tables, or presented logically.

Preferably, requested information is accessed and displayed in sorted or tabulated form, as for example in separate display windows or in the form or formatted electronic data, in response to a single user request or command, without the necessity for the requesting user to issue multiple requests or commands in order to retrieve, sort, order, display, and optionally automatically receive updates to the information in a usable format.

Information can be provided to the requesting user's terminal or to any one or more other designated devices, such as one or more other users' terminals, email addresses, or other output, volatile or non-volatile memory, or printer devices. The system may be used to provide information directly to the requesting user, or to one or more other users or third parties in accordance with designation(s) of the requesting user. For example, a librarian or other administrative user associated with a business, law firm, school, or other entity or organization may request information to be delivered to other individuals associated with the requester's organization.

Provided information, sometimes also referred to as current awareness information, for example where it is provided on an automatically-updated basis, can include both traditional news types, including, for example, newly-issued or released judicial decisions, recently filed court documents, announcements of administrative decisions or legislative actions, new statues and administrative rules, newspaper or magazine articles related to legal topics, etc.; and types not traditionally thought of as news, such as old or new text or other explanatory documents, such as legal textbooks, hornbooks, law review articles, and the like.

Information displayed on computer display screens and/or other devices optionally adapted for interactive input/output processes in response to user requests can be displayed in the form of news headlines, document titles or other identifiers, or documents or otherwise. For example, information related to a news story or judicial decision can be displayed in the form of a headline or case name, or in the form of the underlying article or decision itself. In some embodiments of the invention a summary of an article or other document or data or information set is displayed. Optionally such summaries are multi-line, so that within the window or other portion of the display in which they are presented they wrap around from one line to the next, for as many lines as are required to present a suitable summary. Preferably in such embodiments the requesting user can designate the amount of summary or other identifier he wishes to have displayed on his screen. Where multiple modes for sorting, viewing, and/or displaying data are provided, the user may be enabled to select a different length of identifier, etc., for different views.

In some embodiments, information output in response to requests may be provided in summary form by providing a single document comprising identifying information, such as for example headlines, content summaries, or hypertext links, for one or more other items identified in response to the request. For example, an e-mail containing links to one or more articles or other items relating to a topic of interest may be sent in response to the request, and upon opening and action by the designated recipient, used to provide access to the requested information.

Some embodiments of the invention enable users to access documents or other content information associated with information displayed at their terminals in response to their requests for information. For example, in a system in which information relating to a number of judicial decisions, legislative actions, and/or other types or items is displayed in the form of document titles or summaries, a user may request a related content or document by entering a suitable request or command. Information relating to documents or other data sets may be presented in interactive input-output systems in the form of selectable hypertext or other links, so that for example a user can request an associated document, or information associated with the document such as a redaction or description, by using an input device such as a mouse or other pointer to select a provided link. In either case the system accesses the document or other information and presents it on the user's screen or in other appropriate format. Documents and other information may be stored and displayed in complete or abbreviated form, as for example in redacted or summary form; as full or partial images, as for example in .jpg or .pdf files; ASCII text or mark-up languages such as html or xml; or program files; and headers, summaries, and other identifying information may be stored and processed as part of the same or a separate data set or sets which comprise(s) content information. Thus the system may receive from a requesting user, via the user's terminal, a request for content information associated with a document identified by an item of the displayed information, access within at least one database the requested content information, and cause the accessed content information to be displayed on the display device or otherwise output in accordance with designation(s) of the requesting user. Optionally accessed content or other associated information is displayed in a different display window than the displayed information items, either on the same or a different monitor screen associated with the terminal at which the request originated.

In one aspect the system provides systems, methods, and computer programs and program products for an automated legal current awareness service. A system according to this aspect of the invention comprises at least one computer, at least one database associated with the at least one computer for storing information related to a plurality of legal or other topics, and programming stored on a computer readable medium or media that causes the computer(s) to accept from a user-accessible terminal coupled with the system a request for information related to at least one of such topics; access within the at least one database information responsive to the request; and cause the accessed information to be displayed on a display device associated with the terminal from which the request was received, or otherwise output in accordance with designation(s) of a requester, the information tabulated according to a classification comprising at least two of the topics and/or types or classes to which the information pertains.

A user can request information in many ways. Any manner of providing to a processor sufficient identifiers for a search of the relevant databases will serve. For example, one way is to cause a computer having access to the database(s) to search the database(s) using index structures such as logical address schemes, or character string identifiers such as keywords or strings of textual data content, or any other identifiers suitable for the purposes described herein. In embodiments of the invention providing search capability, a user can be provided a batch or interactive input capability to provide search identifiers to the computer, which uses the identifiers to build logical search structures to search data stored in the databases and provide data identified as satisfying the request to the requesting user.

Requests for information can include requests for information from more than one topic, and/or from more than one type or class of information included within each topic. Topics may be broken down into one or more levels of subtopics, with both topic and subtopic identifiers being useable in identifying data, for example by address, tag, or data content. Multiple requests may be entered in combination, simultaneously or separately, to provide, for example, combined, independent, or refined searches; and results may be provided to the requesting user in batches or in continuous or intermittent streams, simultaneously on non-simultaneously, as for example sequentially or piecemeal. Search data may be saved for modification and or re-use, automatically or upon command of the requesting user, or may be provided in default form, optionally modifiable by the requesting user, by the current awareness system.

Requests for information may also be built from items provided in interactive menus, or in any other manner capable of identifying data sets stored in memory. For example, a requesting user can build a request by accessing an interactive display interface providing selectable items representing topics, subtopics, and types or classes of data from an index tree, with, for example, additional subtopics, together with applicable types or classes, being presented upon selection of related topics in the interactive display.

The system is also adapted to processing one or more requests for information in combination with each other. The requests may be received and processed jointly, or may be received at different times and processed in various combinations requested by the user. For example, one or more requests for information may be entered in the form of a structured search, and put into an active mode as live providers of current awareness data, and/or stored by later use. They may be stopped, or switched to passive mode, independently, at any time upon designation by the user.

In systems according to the invention adapted for the provision of legal information, classifications of information relating to individual topics can by made, for example, by sorting information into classes or types such as administrative action, legislative action, rulemaking, reported judicial decisions, and news. In preferred embodiments at least two of these types or classes of information are provided for legal topics. Topics for legal embodiments of such systems can include, for example, at least one and preferably more of such topics as: admiralty and maritime; alternative dispute resolution; antitrust; trade regulation; banking; finance; bankruptcy; business; commercial; consumer rights; corporate; business organizations; civil rights; collectibles and personal property; communications; media; constitutional; construction; contracts; criminal; education; employment; labor; entertainment; gaming; sports; environmental; estates, trusts, and wills; family; government; elections and politics; government benefits; government contracts; government administration; state government; local government; health; human rights; immigration; insurance; intellectual property; copyrights; patents; trademarks; trade secrets; international; international trade; internet; litigation; litigation administration; appellate procedure; civil procedure; damages and remedies; evidence; mergers and acquisitions; military; natural resources; energy; native populations; professions and occupations; professional licensing; professional responsibility; products liability; real property; science and technology; securities; US federal taxation; state taxation; international taxation; torts; transportation; and workers' rights.

In some embodiments the invention makes use of pluralities of databases for storing information related to requested topics. For example, multiple databases may be used to store information sorted according to individual topics or subtopics, types of information, and/or according to the source of the information.

In some embodiments the invention permits a user to store information in and recover information from one or more restricted-access databases, such as the user's or a third party's secure, private database in a format, or according to a protocol, compatible with that used within databases generally accessible by other users. This permits, among other things, the user to search or otherwise review restricted-access databases (or any other restricted-databases) for information via a single search or other information request. For example, in one embodiment the invention provides a system comprising multiple databases, wherein at least one of the databases is accessible in response to requests received from terminals having a general authorization for access to the system, and at least a second of the databases is accessible in response to requests received from terminals having a specific authorization; and programming causes the system to accept from a user a request for information related to at least one legal topic; access information responsive to the request in both the database or databases accessible by terminals using the general authorization and in those database(s) accessible by use of the specific authorization; and display the responsive information at the requester's terminal or otherwise output the information in accordance with a designation of the requester. In some embodiments of this aspect of the invention the specific authorization carries with it a general authorization, so that a single user or user terminal need provide only a single authorization to access both the restricted-access and public or general-access databases.

In another aspect the invention provides methods, systems, and programming products for processing legal information. The methods include receiving documents and/or other forms or structures of information relating to legal or other topics from one or more information sources, assigning to each received document one or more identifiers indicating (a) which topic or topics document relates to, and (b) which class(es) or type(s) of information the document provides, within the topic(s) to which the information relates. Received documents are formatted according to a protocol, which specifies, for example, the format and content structure of the document and the document identifiers, the location within the content structure of the topic(s) and class(es) of the information, the source of the information, the time/date the information was received, and any other necessary or desired information, as well as the information content associated with the document and the manner in which the information content is included, e.g., as image data, text or hypertext data, or formatted document information such as a MICROSOFT WORD® file. The formatted document is stored in one or more databases, as described herein. A user wanting information relating to the topic to which the information relates enters a request for such data, as for example from a user terminal, and the information processing system receives the request, uses identifiers associated with the stored documents to identify documents responsive to the request, and causes information associated with the identified documents to be displayed on a display at the terminal from which the request was received. Preferably the displayed information is tabulated according to the topics and types or classes assigned to the documents with which the information is associated.

In some embodiments documents or other information is received, preferably formatted according to a suitable protocol, from a number of sources such as vendors, sorted according to type and/or class, and made available to system users. Such systems are useful to, for example, news and information research providers.

Optionally in such embodiments documents are checked upon delivery from the source for compliance with the protocol. If defects are noted in formatting or other protocol requirements, a notice is generated, preferably describing the defects, and is forwarded to the document source. Optionally in such systems a non-compliant document is automatically reprocessed or submitted for further and/or corrective processing.

The invention is suitable for implementation on a wide variety of stand-alone or networked computer systems, such as systems linked via the Internet or other public or limited-access wide-area or local network using wired, wireless, or other forms of communication. In such implementations systems according to the invention can comprise, for example, one or more server-class computers and associated databases, controllers, and processors, and telecommunications facilities for linking, for example via line or wireless telecommunications networks through security firewalls, to large numbers of remote user terminals or user networks, so that the user terminals or networks can be said to be coupled to or otherwise associated with the system. Such systems are well adapted for providing constant, automatically-updated current awareness of continually updated information to subscribers and other users, particularly for providing current awareness information concerning recent developments in particular practice areas of a professional field, such as in the field of law, wherein the current awareness information corresponds to developments in a plurality of relevant substantive areas concerning each particular practice area.

BRIEF DESCRIPTION OF THE DRAWINGS

The invention is illustrated in the figures of the accompanying drawings which are meant to be exemplary and not limiting, in which like references are intended to refer to like or corresponding parts.

FIGS. 4-17 are schematic diagrams of user interface screens showing data displayed at a user-accessible terminal according to preferred systems and processes according to the invention.

DETAILED DESCRIPTION OF THE PREFERRED EMBODIMENTS

Preferred embodiments of the invention are described through reference to the Figures.

Figure 1:
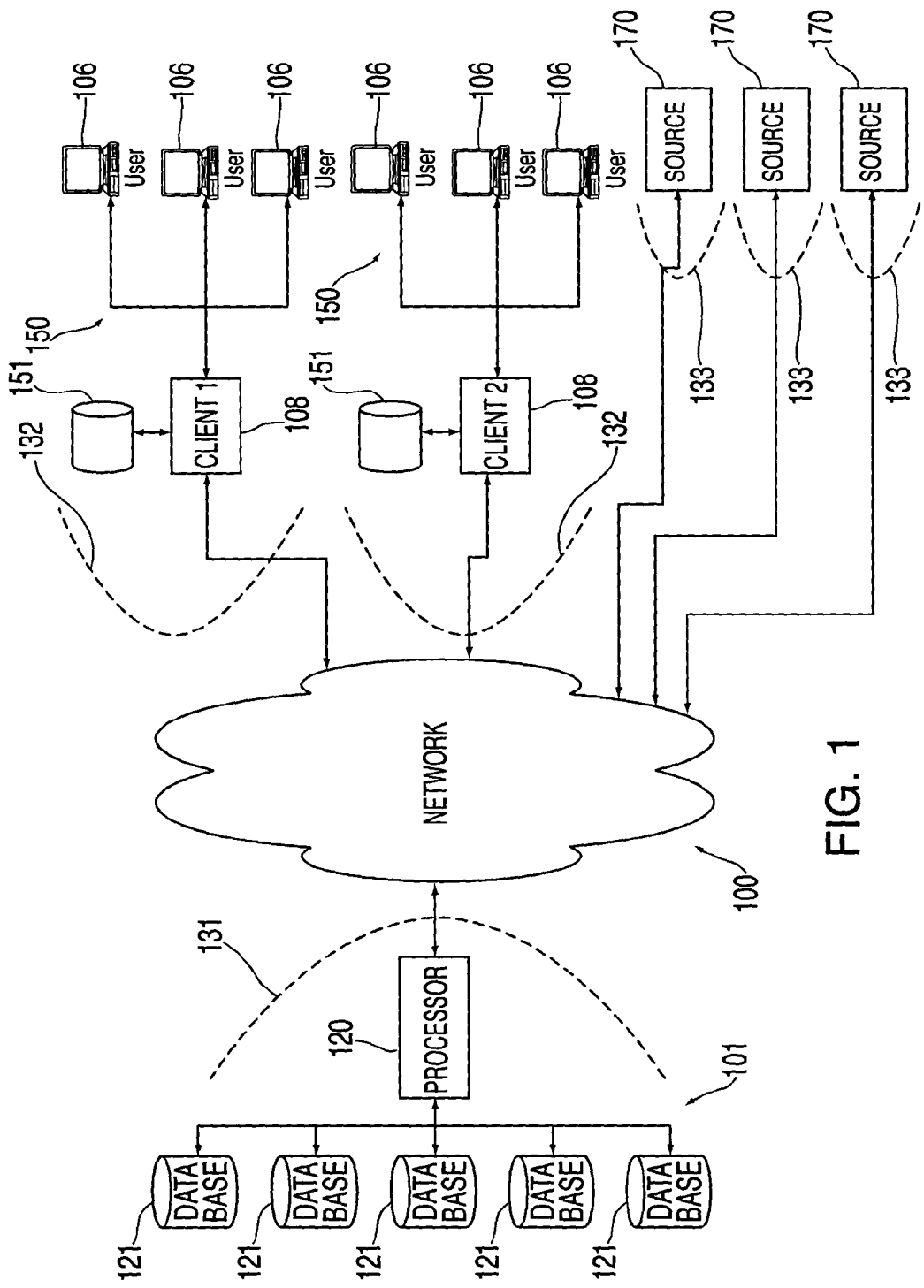
FIG. 1 is a schematic diagram of a preferred embodiment of a system for providing information according to the invention.

FIG. 1 is a schematic diagram of a preferred embodiment of a system for providing information according to the invention. Such a system is represented, for example, by the BLOOMBERG LEGAL™ Current Awareness system proposed for release by BLOOMBERG LP.

Legal information gathering and distribution system 100 of FIG. 1 comprises a plurality of information sources 170 adapted to provide, for example, current, up to date news and information related to a wide variety of legal topics to legal information provider system 101. Sources 170 can include, for example, various reporters or other gatherers of legal news and information, including newly-decided court decisions, reports of court cases, new codifications of statutes, rules, and the like, and other legal, business, professional, and/or news information. Preferably sources 170 provide information to provider 101 via network 102 in a standard format, easily and rapidly useable by provider 101, according to a protocol established by or agreed to by provider 101. Information provided by sources 170 to provider 101 is processed as required and stored in databases 121, and made available to requesting clients at user systems 150, each of which comprises a number of user-accessible terminals 106. Requester user systems 150 can comprise administrative and other special classes of requesting users, and may include one or more other users or user-accessible terminals 106 designated by the requesting users for receipt of current awareness or other information. Requesting users may of course designate their own systems for receipt of requested information. Requesting user systems 150 optionally further comprise one or more client servers or other computers or processors 108, and databases or other memories 151 controlled by the user system 150.

System 100 further comprises any useful or required communications networks, such as the Internet and/or any combinations of local-area or wide-area networks (LANs or WANs) or electronic communications networks (ECNs), including any line or telecommunications facilities for linking, networks through security firewalls or other devices, and routers and the like, to large numbers of remote user terminals or user networks, so that the user terminals or networks can be said to be coupled to or otherwise associated with the system.

Optionally sources 170, provider 101, and requesting user systems 150 each are protected by data firewalls, gateways, and other data and system security measures 131, 132, 133.

System 100 of FIG. 1 is an example of an architecture well suited to implementation of processes according to the invention. As will be apparent to those skilled in the implementation of such systems, may other forms of architecture, including the use of one or more third party database providers, or intermediary systems, will serve.

Figure 2:
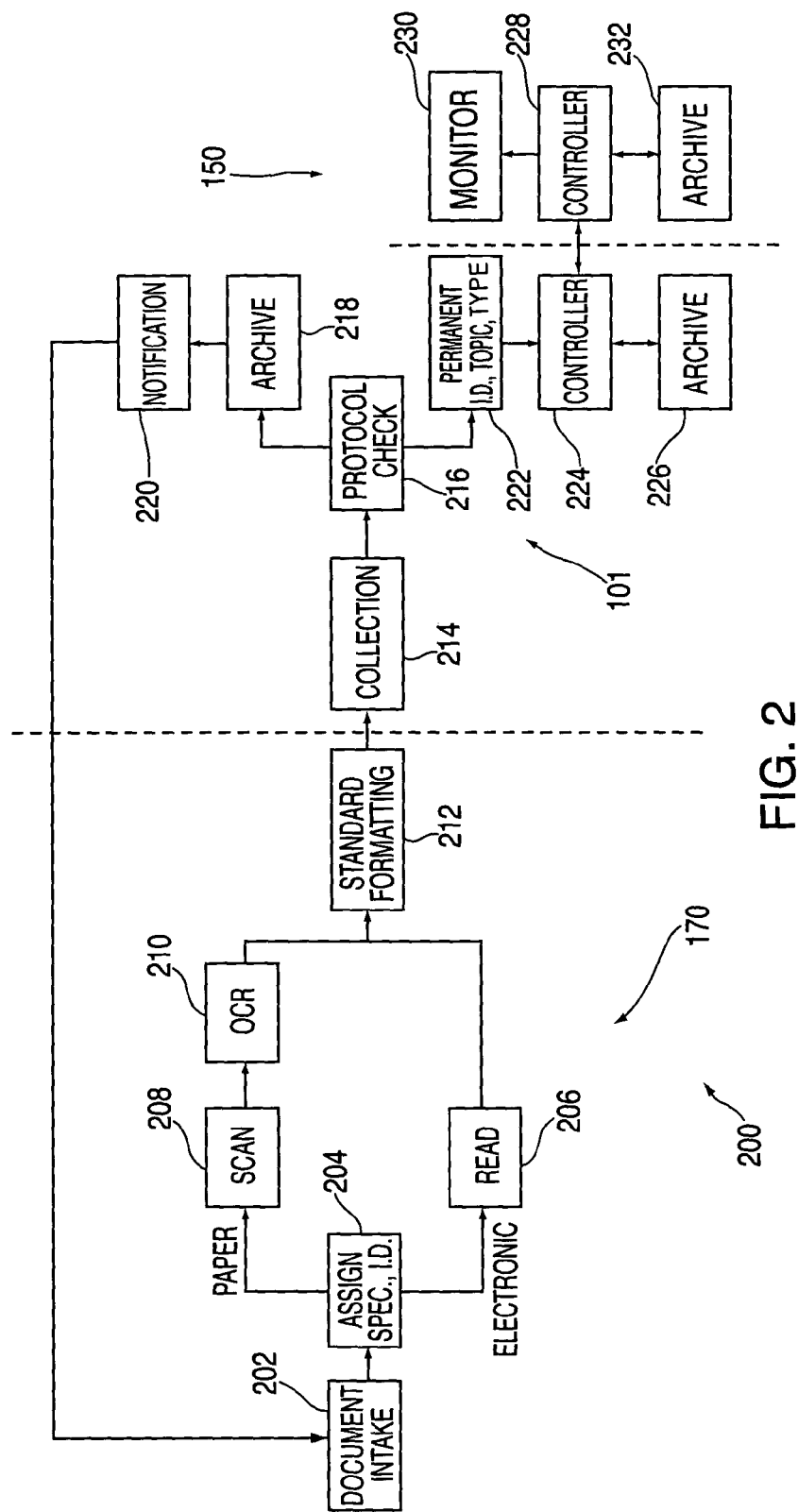
FIG. 2 is a schematic diagram of an information flow according to a preferred process for gathering and providing information according to the invention.

A process for gathering and providing current awareness information according to the invention is shown in FIG. 2. Process 200 of FIG. 2 is shown in an embodiment suitable for implementation by one or more information sources 170, an information provider 101, and one or more information requesting users 150 comprising one or more user-accessible terminals 106, as shown in FIG. 1.

At 202 source 170 (which may include an affiliate of provider 101, as well as any third parties) takes in a new document. A document, in this sense, includes any information relating to topics of interest to requesting users 150, whether in the form of a paper document of one or more pages; one or more electronic data files; or any other form suitable for implementation of the invention. Documents may be gathered or received, in physical, electronic, or any other form, by sources 170 by delivery from outside parties, such as news reporting agencies, court clerks or reporters, authors, etc.; or they may be created by source 170.

At 204 source 170 assigns to and associates with one or more document identifiers to each of the received documents. Identifiers can include, for example, serial numbers, topic label character strings or tags, and type or class labels or tags. The identification process can be manual or automatic, as for example by application of artificial intelligence or other computer processes, or by a blend thereof or any other means suitable for accomplishing the purposes herein. As an example, a paper document received from a court may be read by a lawyer, paralegal, or other trained person, and associated with one or more topics, such as "securities law," "contracts law," etc., and a suitable identification code, label, or tag assigned. Similarly, the same or another person, or an automated process, can classify the document according to type or class within its topic, as for example through the user of artificial intelligence devices. For example, a paper document received from a court clerk's office can be classed as a newly-issued judicial opinion, and assigned a suitable tag or label. Documents may be identified as belonging to one or several topics, and classified as belonging to one or several types, as appropriate. Codes, labels, or tags can be associated with documents physically, by applying stamped ink, typing, handwriting, or stapling of papers, and/or electronically, as for example by attachment or association of identifying tags or characters, or by storage in specified memory locations. Preferably all documents are at some point in the process electronically associated with their identifiers.

In some embodiments of the invention it is advantageous to break down information within a given field into a number of analytical topics, such as those listed herein as examples within the legal field, and to classify information within those topics as belonging to one or more types, where those types are the same or substantially the same or similar across all or most of the topics. For example, in a system for providing legal information using the topic list set out above, the types or classes "administrative action," "current rulemaking," "news," "recent cases," and "legislative alert" have been found to be widely applicable. In some embodiments the use of such widely-applicable types or classes can assist the processing and accessing of information. Information can also be broken down according to, and assigned identifiers as belonging to, one or more layers of subtopics, such topic "property" and subtopics "real estate," "ownership," and "deed of trust." Designation of topics, subtopics, and types or classes may be according to an index tree or other scheme provided, or agreed to, by provider 101.

In a preferred embodiment, assignment of identifiers is included as a portion of a larger document standardizing process referred to as normalizing the document. Normalizing, for instance, may include modifying documents to conform to one or more document templates selected from a plurality of document templates, wherein each document template is specific to the type of document being processed. For example, a document template for a court opinion may require assigning particular code, such as tags compatible with the XML format, to documents to delineate particular document data entries, such as code to identify party names, headings, structural elements, e.g., title, body, paragraphs, lists, list elements, table elements, etc. Similarly, normalizing may include encoding documents to enable administrative functions, such as automated accounting. Moreover, normalizing may include encoding documents to enable the functionality of the current awareness system, such as by encoding documents with appropriate tags and elements to implement a document classification scheme.

In a preferred embodiment, the method of normalizing documents is performed in two stages—general normalization and specific normalization. General normalization comprises modifying documents to conform the document to a document template for the particular document being processed and assigning documents a document identifier or identifiers corresponding to a type identification or classification scheme. The identification scheme may include particular types, or classes, useful in identifying documents with respect to variables common to all types of documents, such as with classes specifying the country of origin, the source of the document, the type of document, the language the document is written in, a billing code, an identification number, a vendor number, etc.

Specific normalization comprises indexing documents, i.e., assigning documents an identifier or identifiers corresponding to a document classification scheme or schemes. In a preferred embodiment, documents will be assigned at least one broad-index identifier corresponding to topics associated with particular practice areas of a professional field and will also be assigned at least one narrow-index identifier corresponding to one or more levels of subtopics associated with substantive areas concerning the particular practice areas. A document classification scheme according to a preferred embodiment is discussed in more detail below. Specific normalization may also include assigning identifiers to documents corresponding to a keyword classification scheme, which associates documents as belonging to at least one of a plurality of predetermined keywords, and assigning a document identifier, which may be used to distinguish documents as belonging to one of a plurality of topic segments.

Once the document has been identified, e.g., indexed, at 204, it is rendered into a computer-readable or -processable form. For example, if the information received at 202 is electronic in form, the identification tag(s) assigned at 204 can be encoded electronically and associated with a data file or data set comprising the document contents. If the information is received in paper form, at 208 its content may be scanned and optionally at 210 converted to machine-readable text by use of a process such as the familiar optical character reading (OCR) process, and identifiers associated with a resultant data file or set.

Once the document has been rendered in electronic form and made available to a source processor, at 212 it is placed into a standard format, optionally provided by or agreed with information provider 101. For example, the tags or other identifiers assigned to the document at 204 are associated with the data file provided at 206-210, as for example by being embedded in file headers separated from the document content by suitable delimiters.

The document having been placed in standard format, it is transferred at 214 to provider 101. Transfer can be on a push basis, with the document forwarded by source 170 when ready; or on a pull basis, in which the document is held ready in accessible memory by source 170 until provider 101 is ready and reads the document from a location specified or agreed between source 170 and provider 101, or by e-mail or any other manner suitable to the objects disclosed herein.

Preferably a part of the process of placing the document in standardized format comprises formatting the document data according to a standardized protocol. In general, electronic documents according to the invention may be in any one of a variety of formats, such as, but not limited to, Standard Generalized Markup Language (SGML), Hyper-Text Markup Language (HTML), Extended Markup Language (XML), Portable Document Format (PDF), Postscript (PS), Rich Text Format (RTF), Hypertext Transfer Protocol over Secure Socket Layer, or HTTP over SSL (HTTPS), or any American Standard Code for Information Interchange (ASCII) format.

Documents received in electronic formats are preferably scanned at step 214 for viruses and other security problems. Documents may be scanned for viruses at any stage of their processing. Preferably, however, at a minimum provider 101 scans for viruses following receipt of a document from an outside source. Documents processed internally by the current awareness service provider, for instance, may be scanned before being converted into to the preferred document format at step 212. Alternatively, in instances where documents are normalized by an external source, the documents may be scanned after normalization. Documents failing the virus scan may be rejected with a corresponding notice generated and such correspondence notice being communicated to the vender automatically, such as by email.

At 216 collected documents are checked for compliance with the protocol established for use within the information system. The protocol can establish, for example, the format of the document data file or data set content (e.g., machine-readable header followed by image, hypertext, or program-specific data) and the format and order of any headers associated with the document. In the BLOOMBERG LEGAL™ Current Awareness system to be released by BLOOMBERG LP, it is envisioned that identifiers and other header material, and optionally document content as well, are to be formatted in XML, or Extensible Markup Language according to standards established by the World Wide Web Consortium (W3C).

If a document fails to comply with the specified protocol, at 218 a copy of the document is placed within an archive, for record keeping purposes, and at 220 a notification is sent by provider 101 to source 170. Optionally the document is automatically forwarded for further processing, or reprocessing, either within provider system 101 or by source 170 or other suitable processor, so that it complies with the specified standard protocol.

Once a document is determined to comply with the specified protocol, at 222 provider 101 assigns to and associates with the document a permanent and unique document identification code, such as a serial number, for use in archiving and retrieving the document, and at 226 the document is archived, as for example by storing it in one or more databases 121. Preferably at the completion of process 222 the identifier associated with document includes identifications of the topic(s), any subtopic(s), and type(s) or class(es) according to which the document has been indexed, so that the document and database(s) are fully searchable by keywords, identifiers, and optionally content by a processor associated with and/or operated by provider 101.

In a parallel or separate process, controller 224 monitors requests for information received from controllers 228 of requesting user systems 150. For example, a requesting user of a terminal 106 of a client 150 logs onto system 101 by means of a suitable log-on/security check process, and requests data relating to one or more legal topics chosen from a list comprising admiralty and maritime; alternative dispute resolution; antitrust; trade regulation; banking; finance; bankruptcy; business; commercial; consumer rights; corporate; business organizations; civil rights; collectibles and personal property; communications; media; constitutional; construction; contracts; criminal; education; employment; labor; entertainment; gaming; sports; environmental; estates, trusts, and wills; family; government; elections and politics; government benefits; government contracts; government administration; state government; local government; health; human rights; immigration; insurance; intellectual property; copyrights; patents; trademarks; trade secrets; international; international trade; internet; litigation; litigation administration; appellate procedure; civil procedure; damages and remedies; evidence; mergers and acquisitions; military; natural resources; energy; native populations; professions and occupations; professional licensing; professional responsibility; products liability; real property; science and technology; securities; US federal taxation; state taxation; international taxation; torts; transportation; and workers' rights.

Controller process 224 receives requesting user 106's request for information, retrieves it from database(s) 121 at 226, and forwards it in a push scheme, as for example as a one-time, continuous, or intermittent data stream, e-mail, or other form preferably designated by the requesting user, or makes it available through a user pull system, as for example by writing it to a dedicated cache or other memory, to user controller process 228. User controller process 228 causes or allows received information to be displayed on the user display device via monitor processes 230, or delivered in another output format to another location designated by the requesting user. Optionally user 150, 106, stores received information via user archive process 232.

Figure 3A:
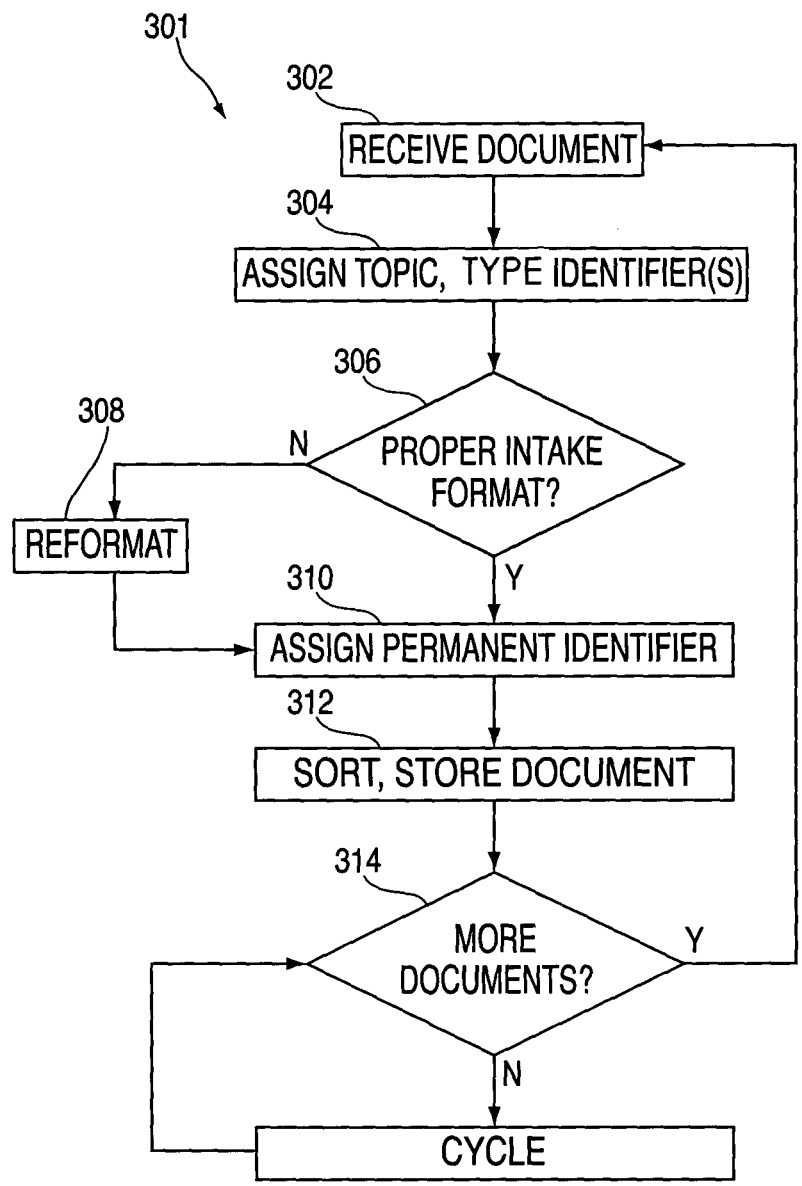
FIGS. 3a and 3b depict schematic flow diagrams of preferred processes for gathering and providing information according to the invention.
Figure 3B:
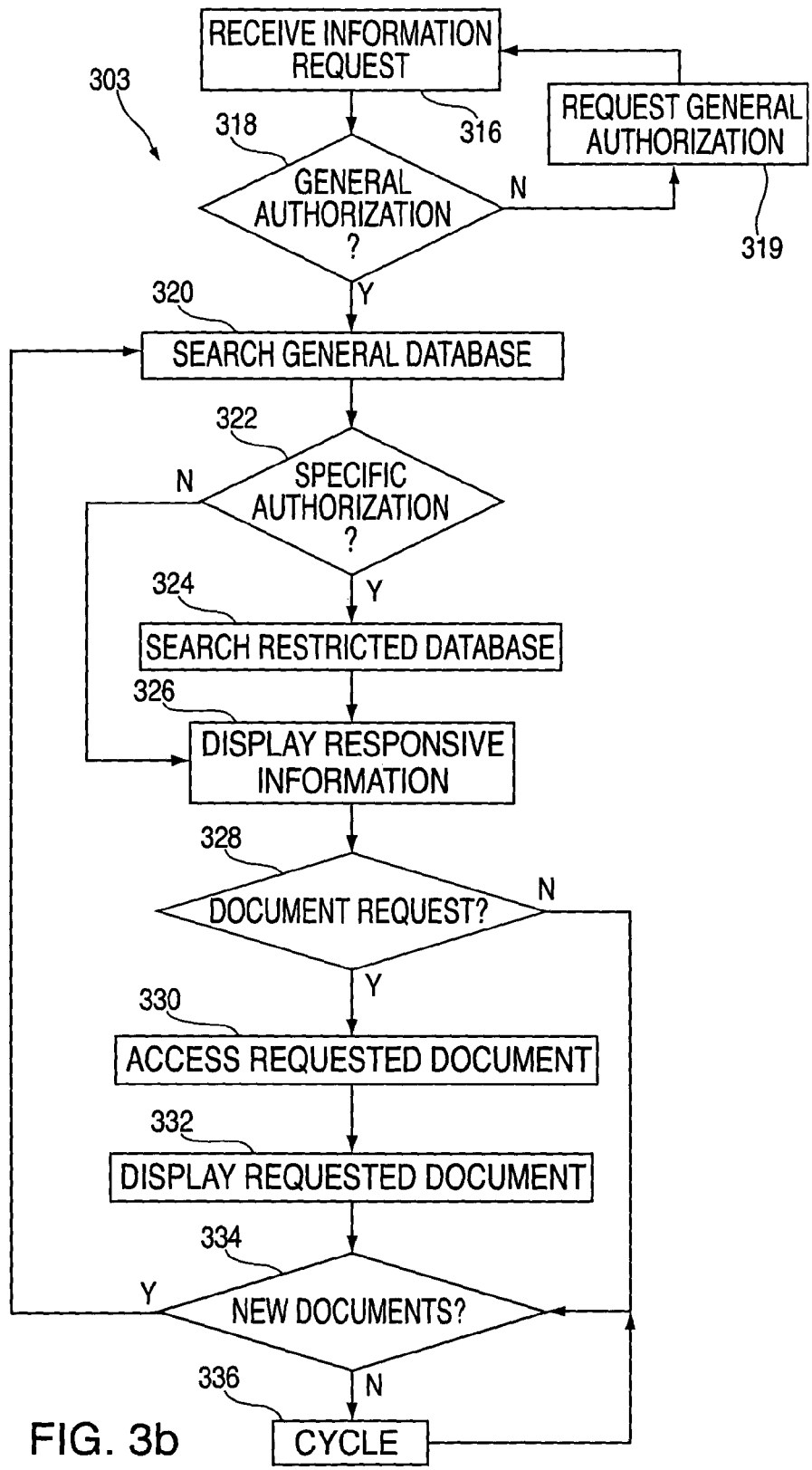

FIGS. 3a and 3b depict schematic flow diagrams of preferred processes 300 for gathering and providing information according to the invention, suitable for implementation on either an open, multi-party system such as that shown in FIG. 1 or within a closed system such as internally within a client or user system 150, or with systems comprising databases provided by third parties.

Process 300 of FIG. 3 may be thought of as beginning at 302 with reception of a new, preferably electronic, document. As described above in reference to FIG. 2, at 302 a new document is received or created, either by some external source or internally, and reduced to electronic form.

At 304 one or more suitable document identifiers are assigned to and electronically associated with the document, the identifiers including, for example, serial numbers, topic and subtopic labels or tags, and type or class labels or tags. The identification process can be manual or automatic, or by a combination thereof or any other means suitable for accomplishing the purposes herein. If necessary, the document is rendered into a computer readable or processable form, and placed into a proper electronic intake format. If the document fails to comply with the proper format or protocol, at 308 it is further processed until it does comply.

Once the document is determined to comply with the applicable format and/or protocol, at 310 it is assigned and associated with a permanent identifier and at 312 is sorted according to the desired storage scheme and stored in the desired database(s).

At 314 a determination is made whether more documents have been received or otherwise become available for processing. Process loop 302-314 continues for so long as and whenever new documents are available.

In a parallel or separate process shown in FIG. 3b, as for example a process run by one or more separate processors in a networked computer system, at 316 provider 101 determines whether a user 150 has entered a request for information, as for example by logging into the system and entering or reopening a subscription for information in one or more legal topics from a user-accessible terminal 106.

If a request has been received, at 318 provider 101 begins a process of checking the database(s) or archive(s) by determining whether the requesting user 150 has a general authorization to access data in one or more public or other general-access database(s). General-access databases include, for example, databases accessible by authorized general users of the current awareness providersystem 101. If the requesting user 150 does not have a general authorization, at 319 provider 101 requests that the requesting user provide a correct authorization, and optionally offers the requesting user an option of registering or otherwise obtaining a general authorization. The process 316-318 is then repeated.

If the requesting user 150 does have a general authorization, at 320 provider 101 searches the general-access data base(s) in accordance with the request, as described herein.

At 322 the provider 101 determines whether the requesting user has any required specific authorizations for access to databases available to restricted subsets of users, as for example where a premium service is offered, or where one or more databases are maintained by a requesting user's own organization, or where one or more third party databases are available to users 150 of the current awareness system. Optionally, if no specific authorizations are required for the request, or provided or recognized by the current awareness system, steps 322-326 are skipped, or omitted. If the user 150 has requested information available from a restricted-access database, but has not provided a suitable specific authorization, the requesting user may be re-requested to provide one, or offered an opportunity to obtain one.

A restricted-access database can comprise one or more separate databases 121 or data structures maintained or controlled by an information provider 101 as shown in FIG. 1, or one or more separate databases or data structures or other memories 151 associated with client system 150 and/or user terminal 106, or one separate or more databases (not shown) maintained by third-party information providers. A specific authorization to access a private database can be of any suitable form, such as a special password or log-in process used in establishing a connection to a provider system 101 or to a local network 150, for example. Likewise, a general authorization can comprise any suitable means for establishing a permission to access the general database, as for example logging into or establishing a connection with the general system.

If specific authorizations apply, and the user has them, at 324 provider 101 searches applicable restricted-access database(s) in accordance with requesting user 150's request, as described herein.

At 326 any information responsive to the request is displayed, or otherwise provided in accordance with a designation made by the requesting user 150, to a computer screen or to another device associated with one or more user terminals 106, including the requesting user's own or one or more other user's terminals 106, as designated by the requesting user. Information provided from general or restricted-access databases may be provided jointly or separately, as determined by the provider 101 and/or the requesting user 150. Preferably the information is sorted as to topic(s) and/or type(s), as requested by the requesting user 150.

At 328 the provider 101 determines whether a user 150 has requested content information associated with an information item provided in response to the request for information, as for example selecting an interactive input/output item on a display screen, or otherwise activating a hypertext or other suitable address link. If content information has been requested, at 330 the requested content information is accessed and at 332 provided in a format and to a device designated by the requesting user.

At 334 provider 101 determines whether any new documents or other information responsive to user 150's request has been added to any database(s) to which the user's request applies and to which the requesting user has access authorization, for example, by continuously or continually repeating process steps 320-324. For example, it is envisioned that sources 170 will provide and provider 101 will index, store, and make available new information on a continuous basis, and that provider 101 will automatically check for new responsive information provided by one or more sources 170 on a continuous or continual, for example periodic, basis, at intervals specified by provider 101 and/or requesting user 150, to provide a continuously or continually updated and/or real time current awareness data feed to the requesting user. If new or previously undelivered cached information is present, it is presented in accordance with the designation(s) of the requesting user, as described.

The processes shown in FIGS. 2, 3*a*, and 3*b* are only representative samples of processes in accordance with the invention. Other processes will accomplish the purposes and effects described herein. Moreover, as will be apparent from reading this disclosure, many of the process steps depicted in FIGS. 2, 3*a*, and 3*b* may be conducted in combination, in the same order shown, or in different orders, and they may be separated into parallel processes and run separately by systems according to the invention.

Many of the functions described in FIGS. 2, 3*a*, and 3*b*, and elsewhere throughout this specification, may be accomplished in a number of ways. For example, the automatic updating of information in response to user requests may be provide by automated pull or push techniques. For example, an information request input by a user may be saved by provider system 101, and automatically reprocessed, according to a frequency designated by the system, by the requesting user, or by both; or the requesting user system 150 can automatically resubmit the request. Any such functions suitable for accomplishing the purposes described herein will serve.

Information provided in response to combined or independent user requests may be provided simultaneously or independently, in accordance with the frequencies of automatic updating as set by the system 101 and/or the requesting user 150.

FIGS. 4-7 are schematic diagrams of user interface screens showing data displayed at a user-accessible terminal 106 according to a preferred process according to the invention, implemented as part of the BLOOMBERG LEGAL™ Current Awareness system to be released by BLOOMBERG LP. This system is a push system, in which newly-received items are forwarded to requesting users who have requested them by logging into the Current Awareness System, in forms and to devices designated by the users.

Figure 4:
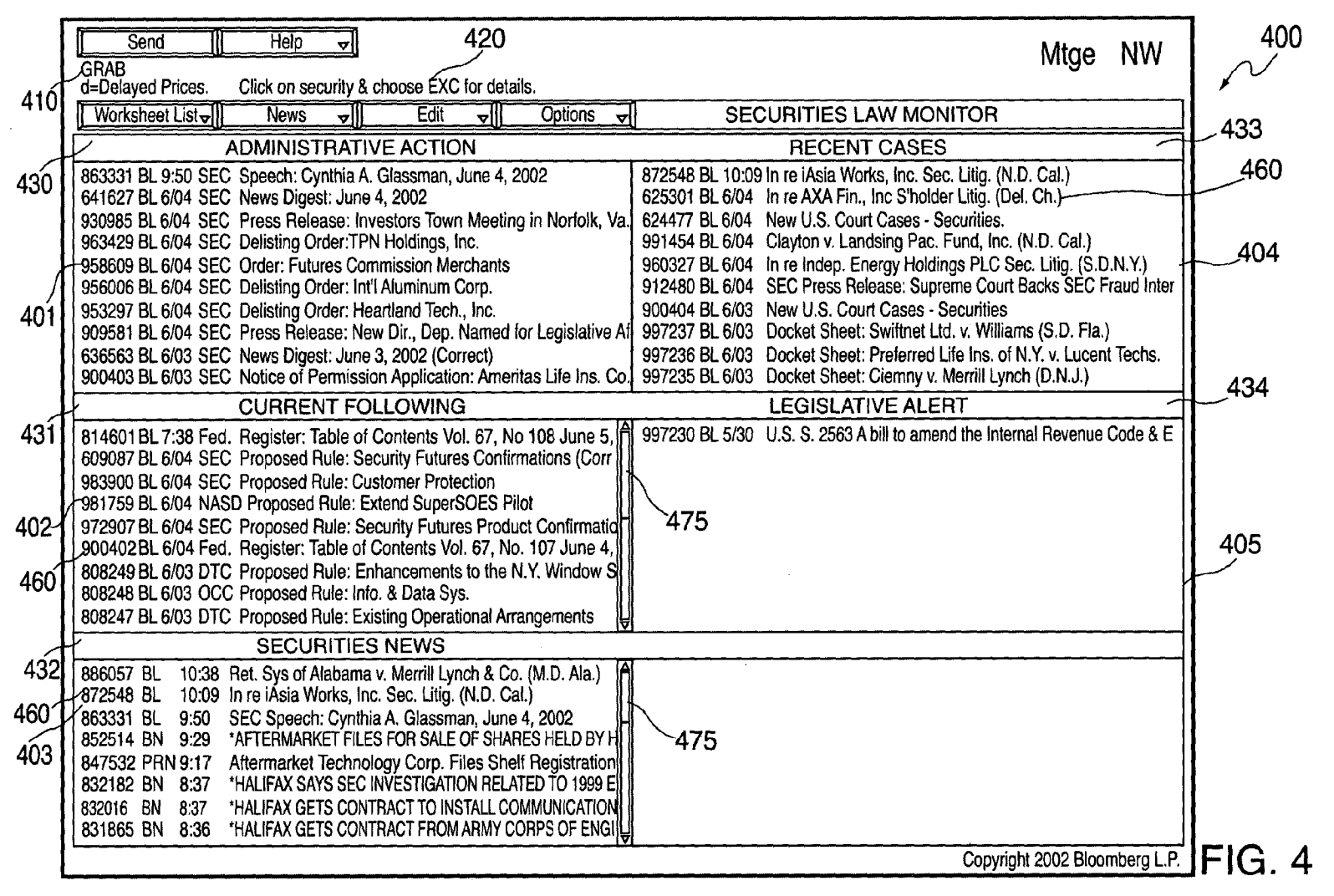

Screen 400 of FIG. 4 shows a single-topic current awareness display screen obtained by entering the command "NW" at command line 410 of a BLOOMBERG PROFESSIONAL® display screen and designating the topic "securities." The securities law monitor display which results comprises a plurality of windows 401-405, each dedicated to the display of a separate type or class of information available for the topic "securities."

Interactive input/output processing in the BLOOMBERG LEGAL™ Current Awareness system is preferably conducted by "point and click" or keyboard keystroke methods. For example, the user of a terminal 106 can proceed with the various tasks described by either placing his cursor over an interactive data item corresponding to the task and activating an instructional address link by activating the "select" button on his mouse or other pointer, or he can enter the corresponding number of the menu item at the command line by using keystrokes from the keyboard. Input functions are typically accomplished in embodiments such as the one described by positioning a cursor within ("pointing" to) a selected image area using a mouse or other pointing device, and activating a control button on the pointing device ("clicking"), or analogous functioning of other pointing devices.

Window 401 of FIG. 4 displays information items relating to the class or type "administrative action", which includes news items, administrative orders, and other items relating to administrative action in the securities law topic. Window 402 displays items relating to the type "current rulemaking" in the securities law topic, including for example rule change proposals published by the Securities Exchange Commission (SEC) and the National Association of Stock Dealers (NASD), etc., and recent relevant publications in the Federal Register. Window 403 displays items associated with the type "securities news" pertaining to news in the securities and securities law topic area, including for example articles gathered from primary and secondary news sources. Window 404 displays items of the type "recent cases" pertaining to recent judicial decisions published in the securities law topic, including for example relevant decisions of the United States and state courts, as well as reports of newly-filed cases and developments in ongoing cases. Recently updated court docket reports are also available, along with other suitable data items.

Several information items 460 shown in the separate windows of FIG. 4 appear in more than one window. For example, the item "In re iAsia Works, Inc. Sec. Litig. (N.D. Cal)," item no. 872548, appears both in "securities news" window 403 and "recent cases" window 404. The item "SEC Speech: Cynthia A. Glassman, June 4, 2002," appears in both "securities news" window 403 and "administrative action" window 401. Thus it may be seen that individual documents and their associated descriptors, etc., can be identified and indexed as relating to more than one type or class of information. Likewise, a single item may be identified as relating to more than one topic of information, such as for example "securities law" and "international law."

The amount of descriptive or other material related to a document and shown in the windows of screen 400 of FIG. 4 can be designated by the requesting user, as for example by selecting "options" icon 420 through use of a computer pointing device in conventional windows pull-down menu or item selection fashion and entering suitable data in an interactive screen adapted to elicit preferences. Similarly, the size and arrangement of windows 401-405 can be specified by the requesting user, for example by using Windows-style window configuration commands.

The information displayed in windows 401-405 can be provided in response to a single or multiple information requests, as described herein, and can comprise automatically-updated current awareness information.

Once a user has logged into the NW screen and has begun to receive data, the screen is continually and/or periodically refreshed, and new items are added to the top of the lists displayed in the various windows as provider 101 monitors newly-received data items entered by provider 101 and/or sources 170. As individual type and/or topic windows fill, old information may be scrolled down out of the visible portion of the window. Optionally scroll bars such as those commonly used in windows-type operating systems may be provided to facilitate review of and access to documents outside the current display range of a particular window.

A user interested in more closely monitoring information of a single topic or type or class within the designated topic may do so by selecting one of header icons 430-434. For example, selection of "administrative action" header icon 430 in FIG. 4 results in presentation of a screen such as that shown in FIG. 5, which displays the same information shown in window 401. The screen of FIG. 5 may be displayed on the same screen as that of FIG. 4, for example by overwriting the previous display, or it may be presented in a separate screen, as for example a second screen in a multi-screen display such as those commonly provided for subscribers to the BLOOMBERG PROFESSIONAL® system.

Figure 5:
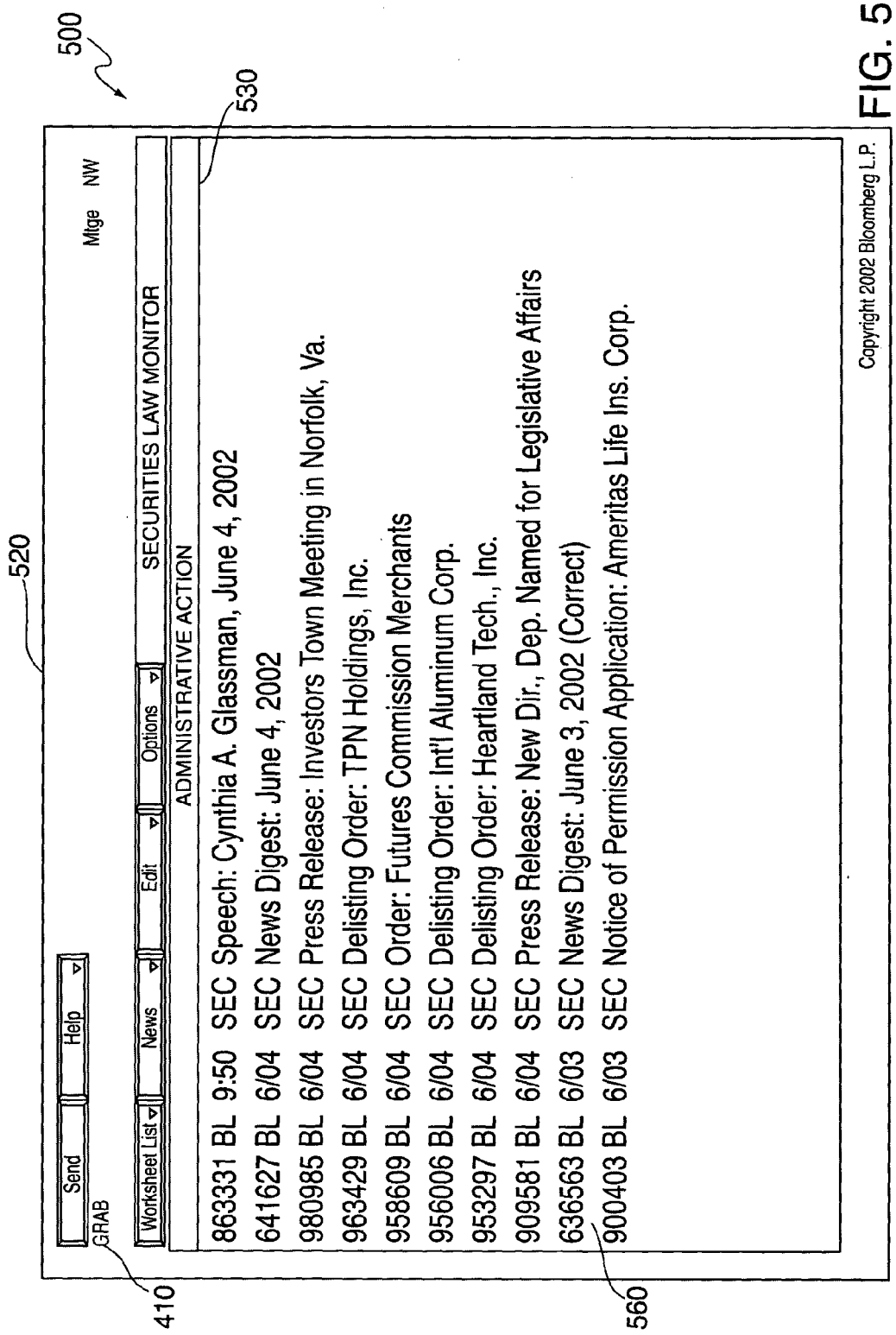

The display of FIG. 5 shows the same information as that of window 401 in FIG. 4. Optionally, however, the user can select "options" icon 520 and elect to increase the maximum acceptable length of any particular item 560, for example by specifying that an item 560 may wrap around into a second, third, or subsequent line on the display, so that the information displayed is an expanded or abbreviated version of the information of FIG. 4.

Figure 6:
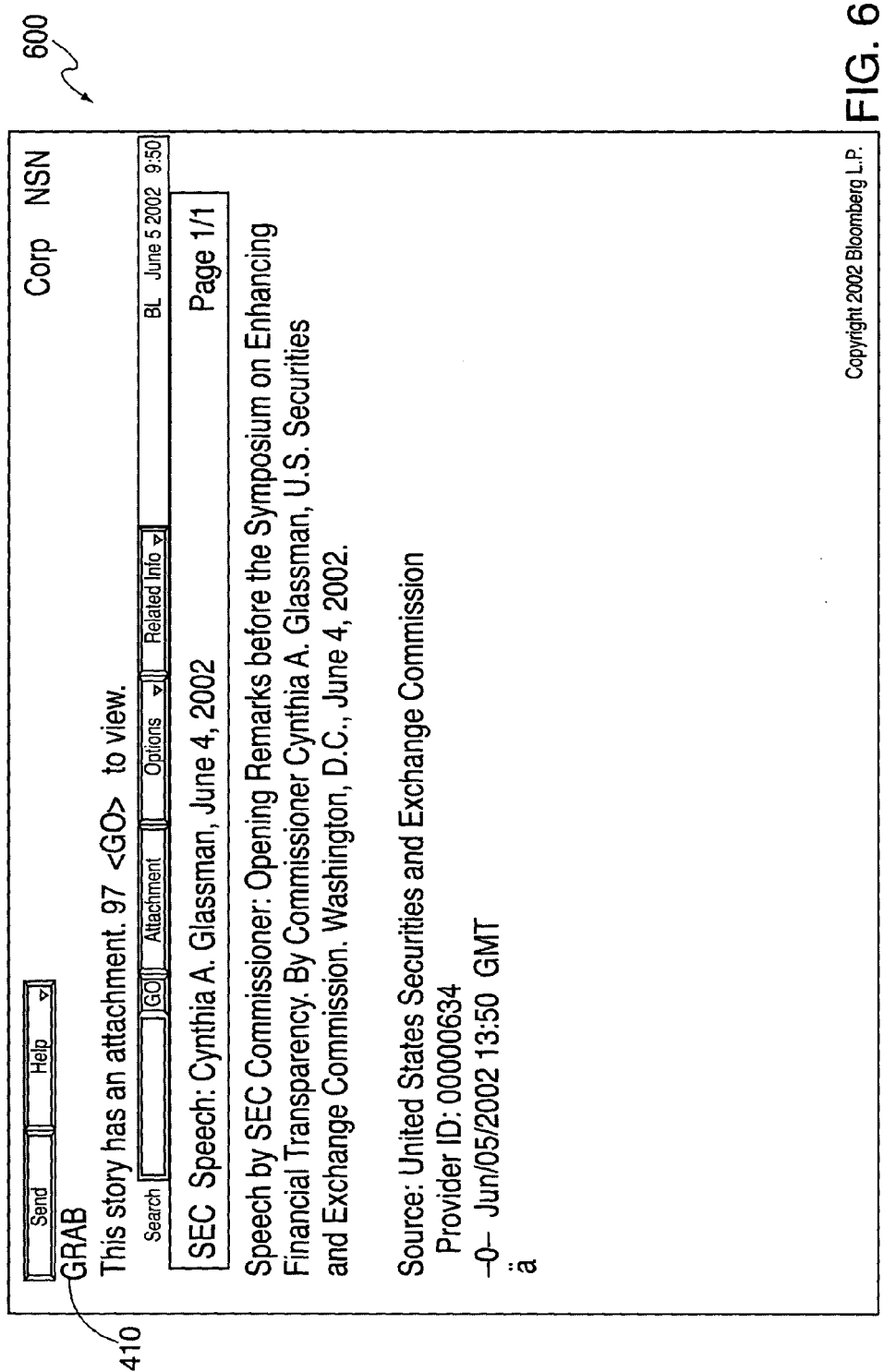

A user of a terminal 106 desiring to review a particular item 430, 530 in greater detail may do so by, for example, selecting the item using a suitable interface controller such as a mouse, trackball, or other pointing device, as described herein. Selection of the item 460, 560 "SEC Speech: Cynthia A. Glassman, Jun. 4, 2002," for example, in either window results in display of an expanded description, as shown in FIG. 6, in which further details relating to the associated content information are displayed.

A user desiring still more information can request to have the content of the associated document displayed by entering the corresponding item number or another assigned command at command line of screen 600. In the case of the speech referenced in FIG. 6, this would result in presentation of the full text, in ASCII code or optionally as a document image, in a new window such as that shown in FIG. 7 for a judicial decision "Ballenger v. Applied Digital Solutions, Inc., (Del. Ch.)." Optionally again the document content may be displayed on a separate display screen, as for example where multi-screen displays are used.

FIGS. 8-17 are schematic representations of interactive interface screens proposed for an alternative implementation of the BLOOMBERG LEGAL™ Current Awareness system. It is envisioned that such screens will be displayed at user-accessible terminals 106 for use by users of systems 150 in, for example, inputting data and evaluating system output.

Figure 8:
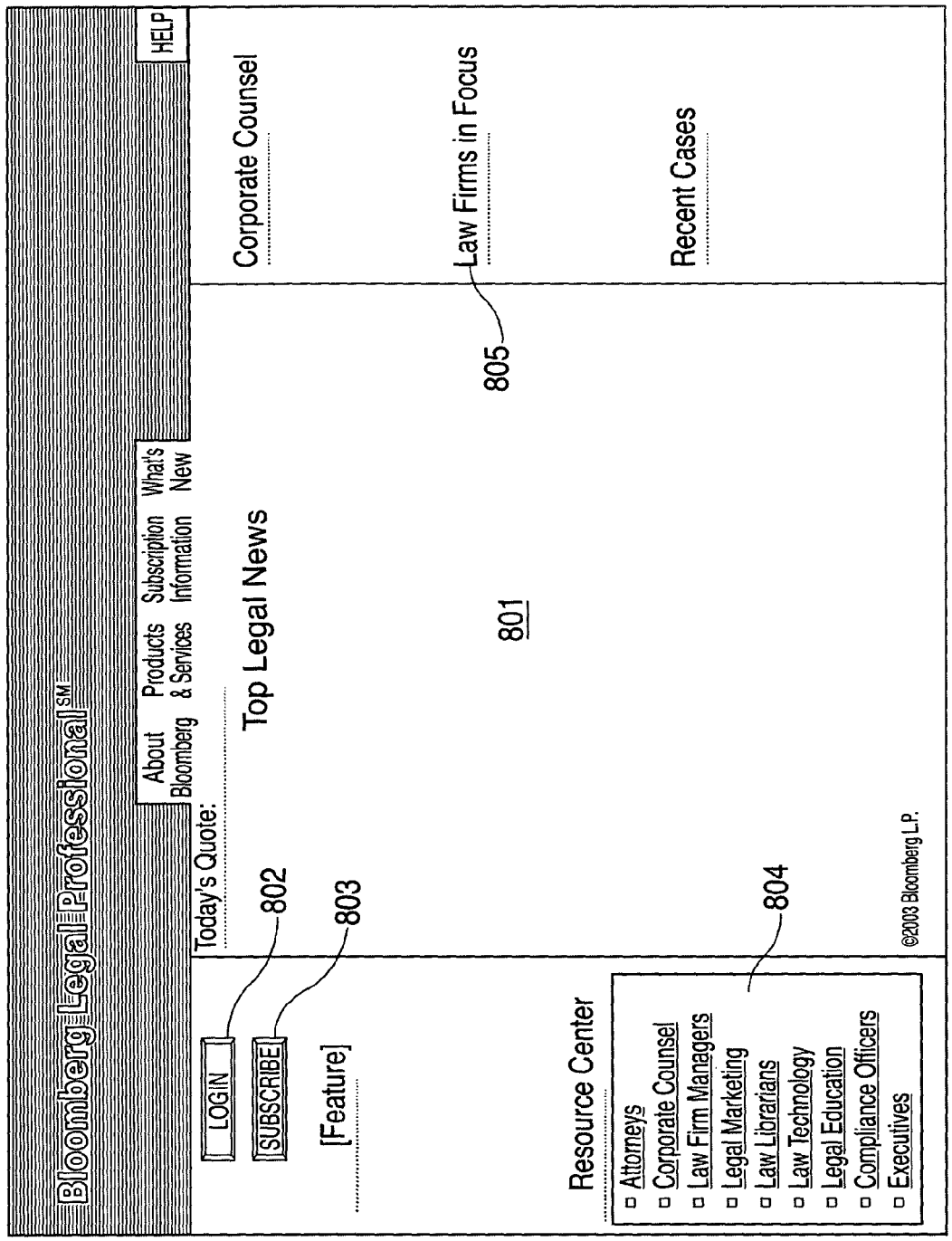

FIG. 8 depicts user log-in page, comprising portion 801 for display of current top legal news or other information (not shown) provided by provider 101, optionally in accordance with preferences previously set by a requesting user 150. The screen also comprises a selectable item, or icon 802, selection of which presents a login screen for use by a subscribing requesting user 150, and a "subscribe" icon 803 for registration by new users. A number of other icons providing access to general information, such as attorney listings, corporate counsel listings, recent cases, etc., are provided at 804 and 805.

Selection, in the manner described herein, of any of icons 802-805 by a user 150 results in activation by provider 101 of a hyperlink to a command operation, which causes a related command to be executed, resulting in the presentation of a screen comprising corresponding interactive input/output fields and/or information content.

Figure 9:
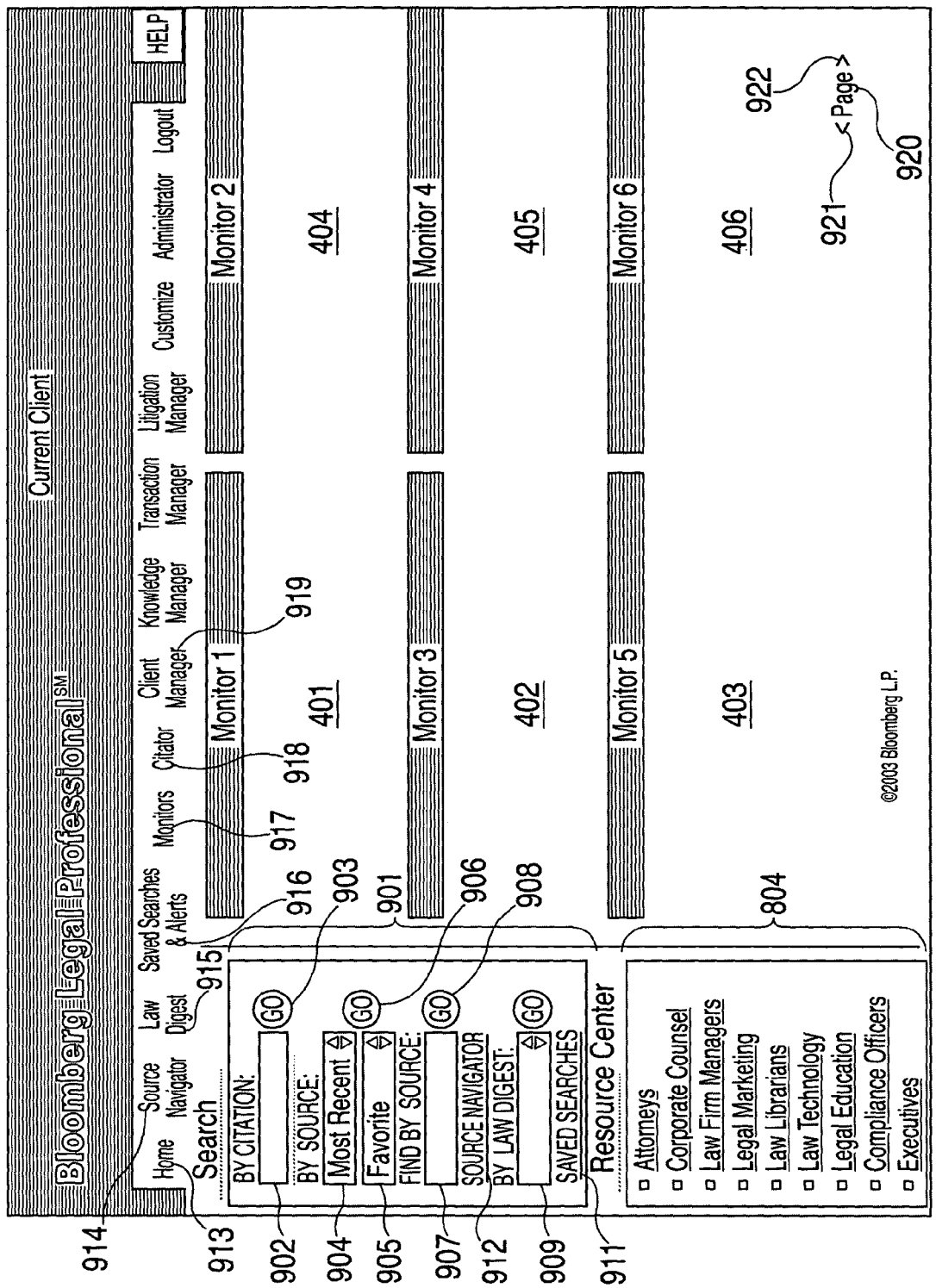

Activation of login icon 802, and entry of suitable user identification and optionally passwords or other security data through use of a suitable interactive interface screen results in presentation of a base screen such as that shown in FIG. 9. The base screen depicted in FIG. 9 comprises a number of display windows 401-406 for presentation of data items provided by provider system 101 in response to one or more information requests entered by a requesting user 150, as described above in connection with FIG. 4. Upon entry of one or more new requests and/or invocation of one or more previously entered requests, separately or in combination, as described herein, information responsive to the request(s) is displayed in one or more of windows 401-406 by provider system 101. Displayed information is optionally useable for accessing data content associated with displayed data items, as herein described.

The number, size, and content of windows 401-406, and optionally other parameters governing the tabulation of data provided in response to the request, is optionally settable by a requesting user, as previously described. If a user has entered requests, or is otherwise being provided information for more than six windows 401-406, additional windows are accessible on separate pages consisting of additional windows in similar format, accessible by selection of "page" link 920 or "forward" and "back" arrows 921, 922.

The screen of FIG. 9 further comprises search portion 901, which comprises citation data input field 902. A requesting user may enter a search for items related to specific legal cases by entering a suitable case citation in field 902. By entry a citation and selection of "GO" icon 903, a requesting user causes user system 150, by means of a user-accessible terminal 106 to forward to provider 101 a request for information, the request comprising identifiers corresponding to the citation, and provider 101 searches general-access databases 121 and optionally any private databases 121, 151 (and third party databases not shown) for which the requesting user has authorizations for cases and other information items associated with the entered citation, and provides information responsive to the request to one or more of windows 401-406.

Search fields 904, 905, 907 and "GO" icons 906, 908 provide user systems 150 and user-accessible terminals 106 with input capabilities for searches based on one or more sources 170, in accordance with choices provided on drop-down menus in a Windows-style input process and/or source keyword character strings. Requests for searches including identifiers corresponding to one or more sources 170 causes provider 101 to search one or more of general- and private-authorization databases 121, 151, and unshown third party databases for information comprising identifiers associated with the entered data sources 170, which can include, for example, information provided or processed by one or more of sources 170, if provided with suitable identifiers.

Topic, subtopic, type-based, and/or keyword searching of an information index provided by or through system 101 is provided through input field 909.

Selection of "Saved Search" link 911 results in presentation of a interactive interface screen such as that shown in FIG. 14, discussed below. Selection of "Source Navigator"

link 912 or link 914 results in presentation of an interactive interface screen such as that shown in FIG. 10, discussed below.

Figure 16:
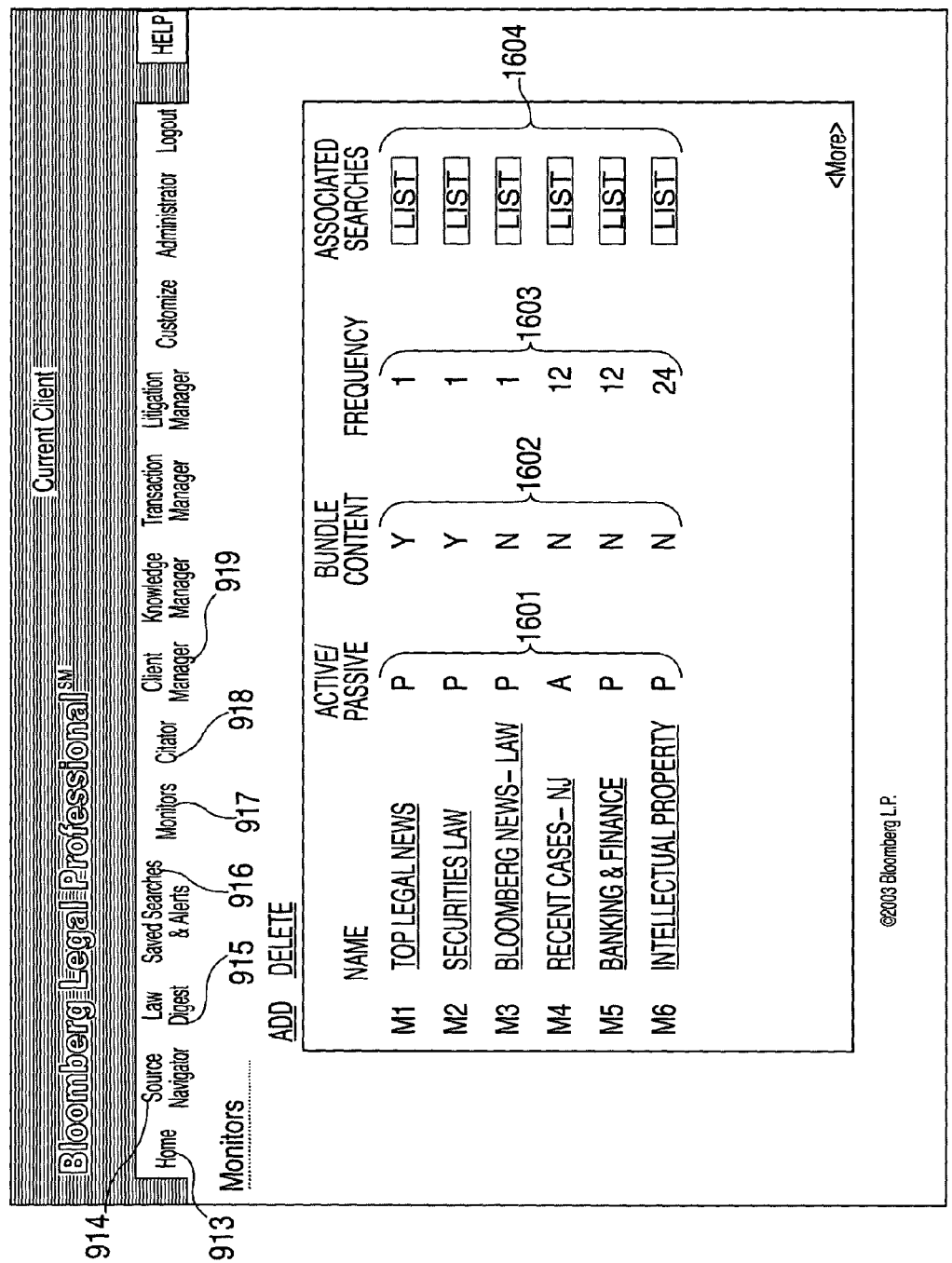

The screen shown in FIG. 9 also presents a number of icons, selection of which provides other interactive screens useful for entering and managing new and saved requests, or searches. Selection of "Home" icon 913 returns the requesting user to the interactive interface screen of FIG. 8. Selection of "Law Digest" icon 915 results in presentation of an interactive interface screen such as that shown in FIG. 12, discussed below. Selection of "Saved Searches and Alerts" icon 916 results in presentation of an interactive interface screen such as that shown in FIG. 14, discussed below. Selection of "Monitors" icon 917 results in presentation of an interactive interface screen such as that shown in FIG. 16, shown below. Selection of "Citator" icon 918 results in presentation of an interactive interface screen providing search capabilities similar to those provided by items 902 and 903, as described. Selection of "Client Manager" icon 919 results in presentation of an interactive interface screen such as that shown in FIG. 17, described below.

Figure 10:
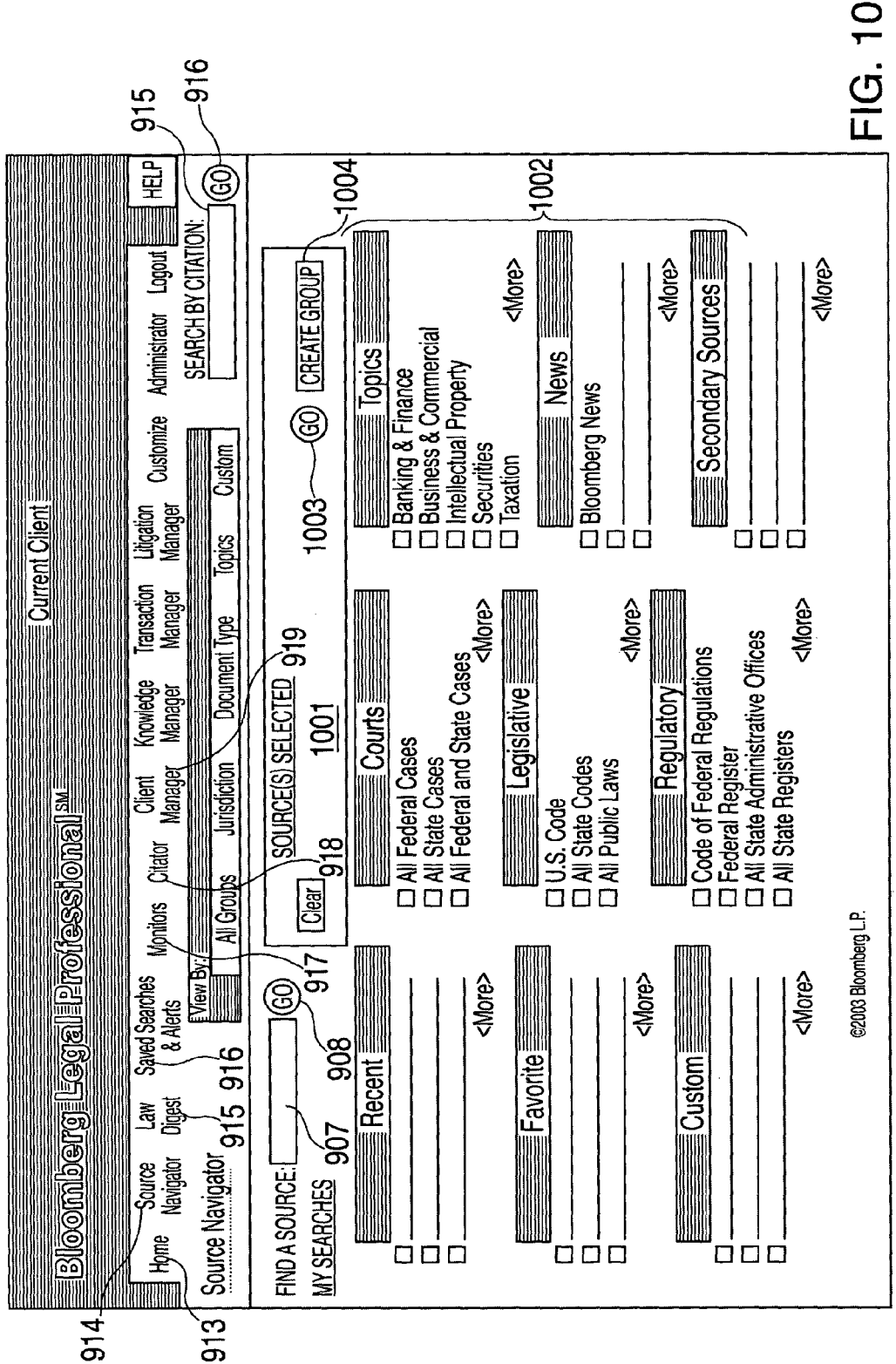

Selection of "Source Navigator" link 912 or link 914 results in presentation of a screen such as that shown in FIG. 10. The screen depicted in FIG. 10 provides several links and icons similar to those shown in FIG. 9 and other Figures, such as icons 913-919 and input fields 907, 908. Commonly numbered items shown in the figures are similar or identical, and provide similar or identical functionality.

In addition to fields and items previously described, the screen of FIG. 10 comprises field 1001 for displaying a list (not shown) of selected sources 170, and icon "CREATE GROUP" 1004 for the creation and saving of groups of sources, for use by a requesting user 150 modifying existing search requests and in formulating future search requests. Also provided are groups 1002 of links to lists of sources grouped by types and/or topics, as indicated. Selection of one or more sources, or groups of sources, by selection of corresponding icons, results in designation of suitable identifiers for inclusion in a request to be made to provider 101, and display of the same or corresponding identifiers associated with the selected sources in field 1001.

The interactive screens of FIGS. 9 and 10, and of the other figures described herein, provides a convenient and efficient way of designating identifiers to be used by provider 101 in building search requests for information stored in databases 121, 151, etc., for identifying information responsive to the user 150's search request, as described herein.

Figure 11:
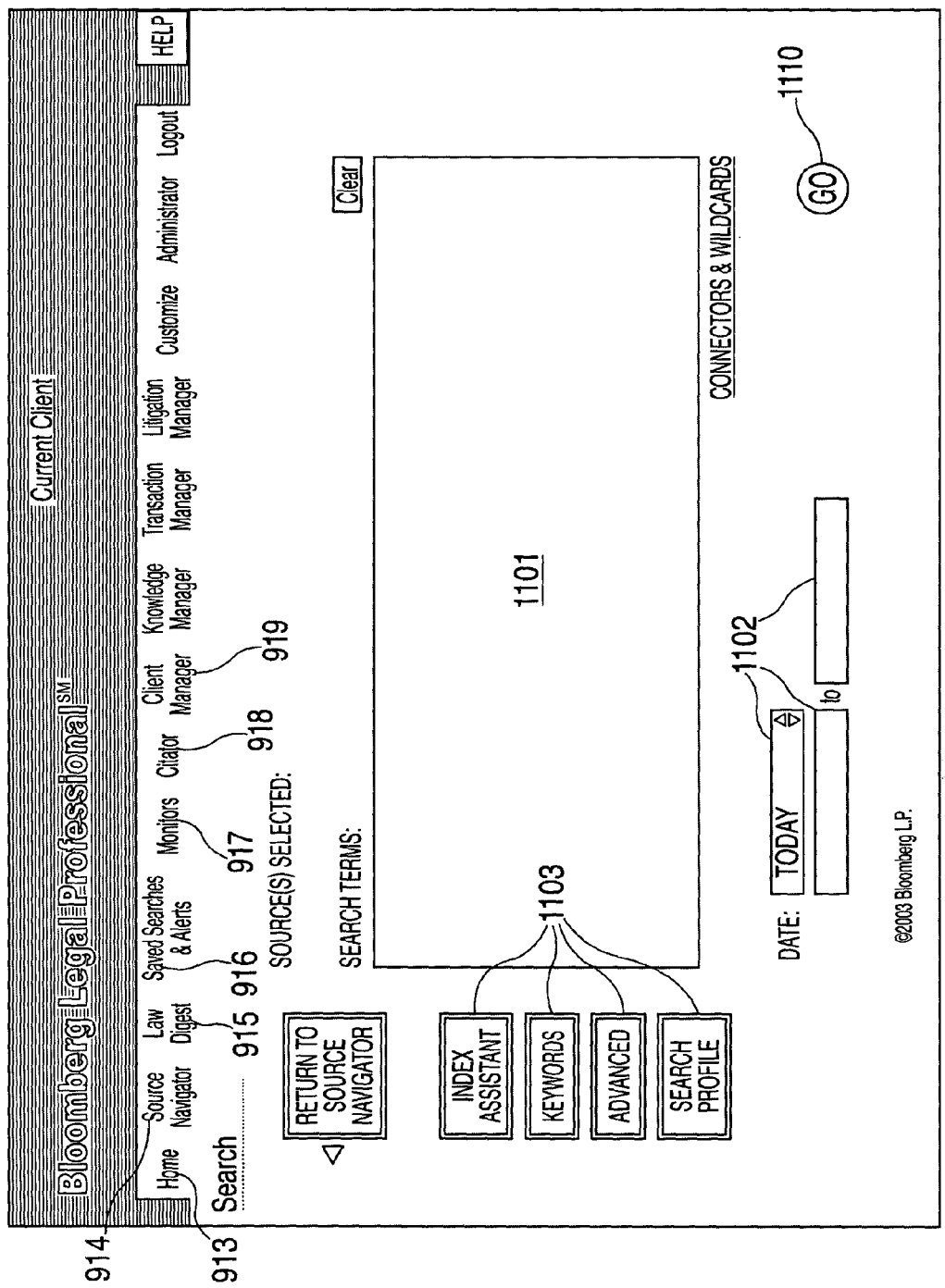

Selection of "GO" icon 1003 of FIG. 10 results in presentation of a screen such as that shown in FIG. 11. The screen depicted in FIG. 11 includes field 1101, which upon presentation contains any search terms or other identifiers previously entered by the requesting user, as for example in field 1001 of FIG. 10. Selection of one or more of icons 1103 of FIG. 11 presents lists of selectable index terms corresponding to topics, subtopics, etc., included in the index provided by provider 101 of information available in databases 121, 151, etc.; lists of keywords useful in searching the databases, advanced search options, including optionally Boolean or other logical rule-based search capabilities; and profiles of other searches stored by the requesting user. Selection of items presented in such lists results in display of additional search terms, including index items, keywords, etc., in field 1101, in addition to search terms previously entered in field 1101.

Fields 1102 provide further search identifiers, consisting of input fields for individual dates and/or ranges of dates, by selection of default values offered by pull-down or scroll menus, or by keyboard keystrokes, which may be added to the search terms displayed in field 1101.

When all desired search terms have been selected or otherwise entered and displayed in field 1101, the user can select "GO" icon 1110. Selection of icon 1110 causes a corresponding search request to be sent by the user's terminal 106 to provider 101. The search request comprises identifiers corresponding to all designated sources, date ranges, keywords, index items, text strings, and other identifiers entered by the requesting user; and the resulting search performed by provider 101 is conducted in accordance with any designated Boolean or other logical rules.

Figure 12:
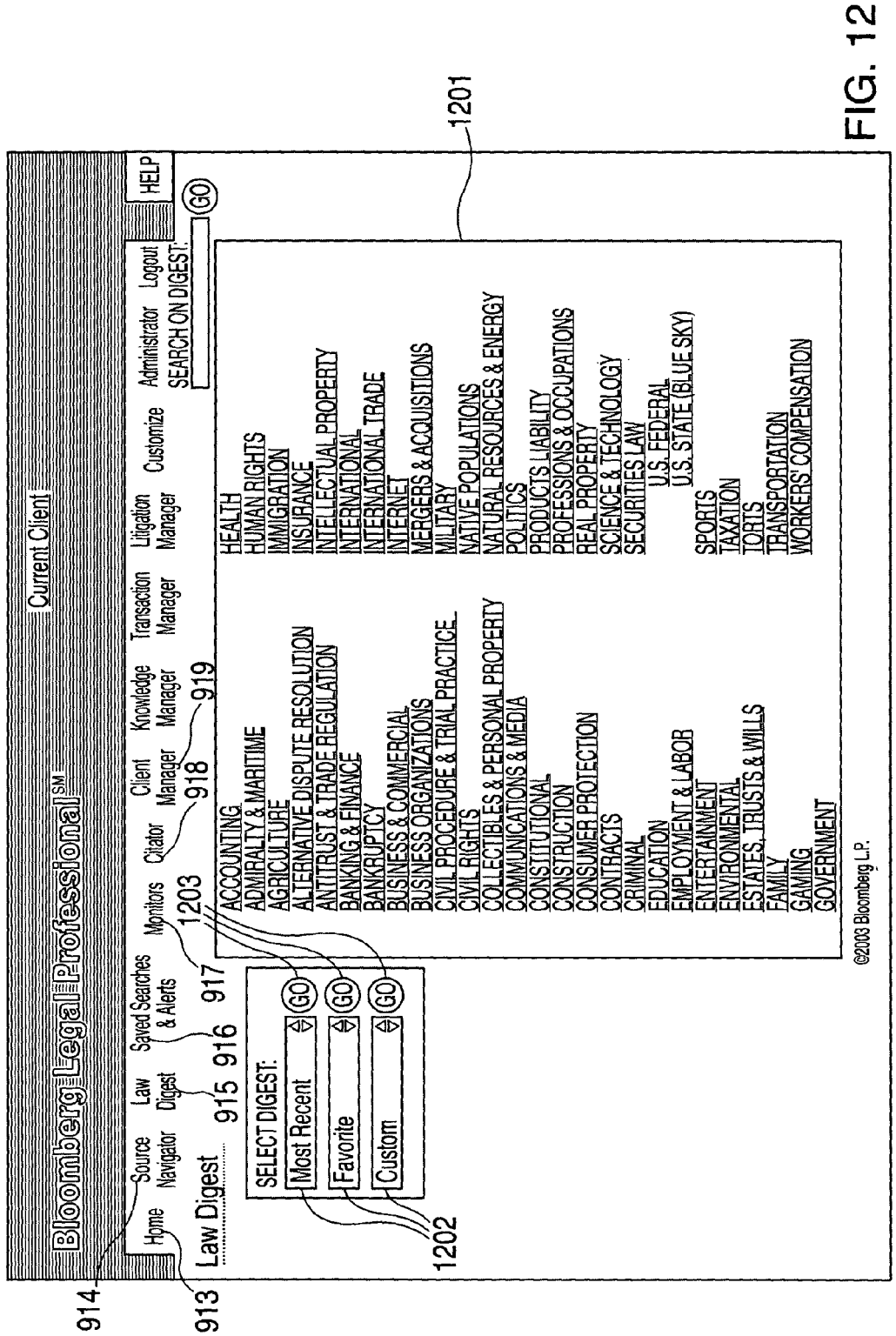

Selection of "Law Digest" icon 915 from any of FIGS. 9-17 results in presentation of a screen such as that shown in FIG. 12. The interactive screen shown in FIG. 12 provides one or more lists 1201 of topics included in an index provided by system 101 of information items stored in one or more of databases 121, 151, and optionally any third party or other databases. Items shown in list(s) 1201 comprise interactive links corresponding to the various topics, the selection of which causes an identifier associated with the topic to be included in the search logic to be submitted by user-accessible terminal 106 to provider system 101, and optionally causes a list of a next layer of selectable subtopics related to the selected topic(s) to be displayed, selection of which may cause lists of further subtopics on other, subordinate levels, to be displayed. Thus a requesting user is enabled to navigate through an entire topical index of the entire contents of databases 121, 151, etc., and to construct a search request consisting of identifiers corresponding to any number and combination of topics, subtopics and types of information to which access is provided by system 101.

The screen of FIG. 12 further provides fields 1202 for providing additional identifiers corresponding to desired versions of the provided digest, to previously conducted or defined searches, and/or to options for new or default searches provided by system 101. Selection of one or more items presented in drop-down menus generated by the system using fields 1202, and of one of "GO" icons 1203, causes a search request built on topic, subtopic, and other identifiers, including data types, to be sent to provider 101 and used in searching the various information databases.

Figure 13:
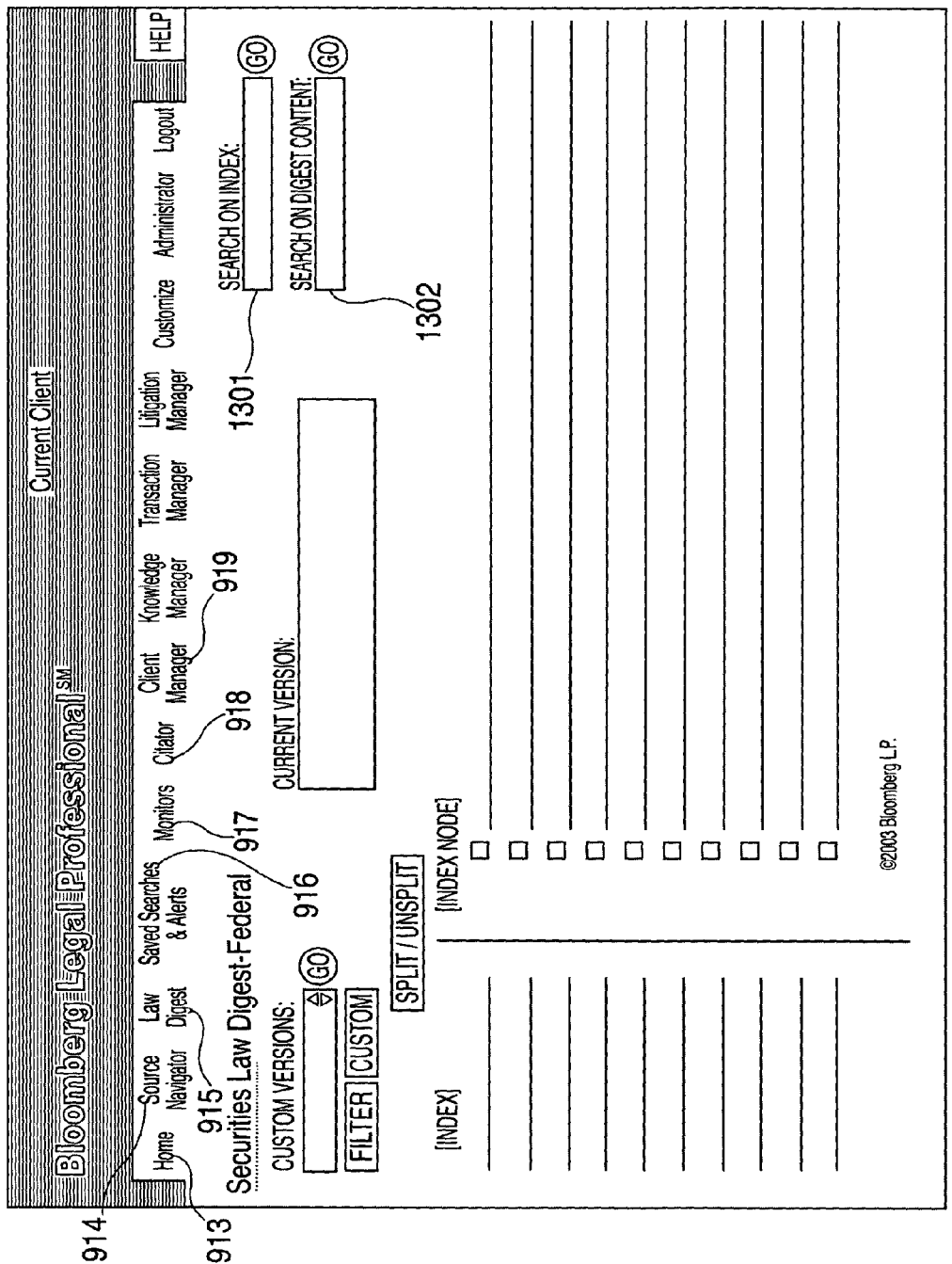

FIG. 13 depicts a screen provided upon request of a user for subtopics and other index features for interactively building a search request. For example, icon 1301 provides an input field for keywords to be use in a search of the database index, and icon 1302 provides an input field for searching of index content. Screens of the type depicted in FIG. 13 may be invoked by selecting, for example, topic links presented in list(s) 1201 of FIG. 12.

Figure 14:
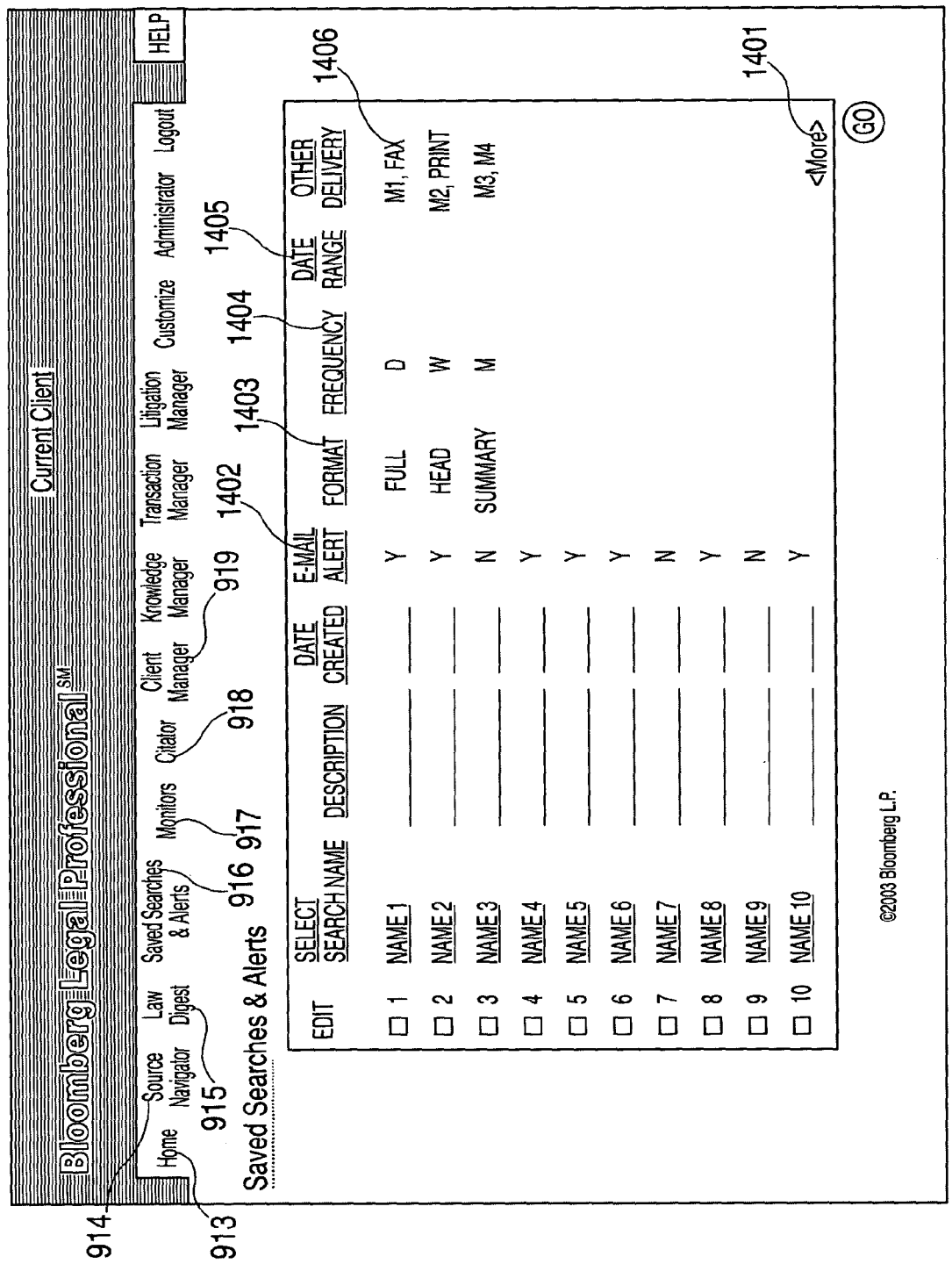

Selection of "Saved Searches and Alerts" icon 916 results in presentation of a screen such as that shown in FIG. 14. The interactive screen depicted in FIG. 14 provides lists of requests previously submitted by a user 150, for use, for example, in obtaining quick and convenient access to desired information contained in databases 121, 151, etc. Each of the listed searches may be activated alone, or in combination with each other. A requesting user is provided with fields for entering text, date, and/or other descriptions of searches, for use in identifying particular searches, and for designating the destination device(s) and form, including tabulation options, of information output by system 101 in response to the user's requests. A user may save as many searches as he/she desires, optionally up a limit set by provider 101 or by the user. If more searches are saved than may be shown on a single screen, additional searches may be viewed and accessed by selection of items 1401.

Selection of link 1402 causes the system to present a screen adapted for interactive entry by a requesting user 150 of flags and other controls for causing provider 101 to send to the user, or to other individuals or systems designated by the user, of e-mail alerts regarding the availability of new information provided by system 101 in request to the corresponding searches. Optionally, the content of e-mail alerts may also be designated; for example, an e-mail alert may be set to provide the full text of new information items, or groups of summaries of new information items, or groups of links to new information items. E-mail alert options may be set independently on a search-by-search basis.

Selection of link 1403 provides the requesting user terminal 106 with interactive screens for designating length and detail attributes of displayed information items corresponding to the various search requests, including, for example, full content, headlines, or other summaries, as described herein.

Selection of link 1404 provides the requesting user with interactive capability for designating a frequency with which provider 101 accesses databases 121, 151, etc., to identify new information responsive to the search requests. Frequencies may be set in any time units enabled by system 101, as for example minutes, hours, days (designated by "D"), weekly ("W"), or monthly ("M"), etc.

Selection of link 1406 provides a requesting user with the option of designating other forms and/or formats for delivery of information items identified and tabulated in response to the user's requests and designations, for example, facsimile, print, text files of designated formats, or any other form or manner of output, electronic, printed, or other.

Figure 15:
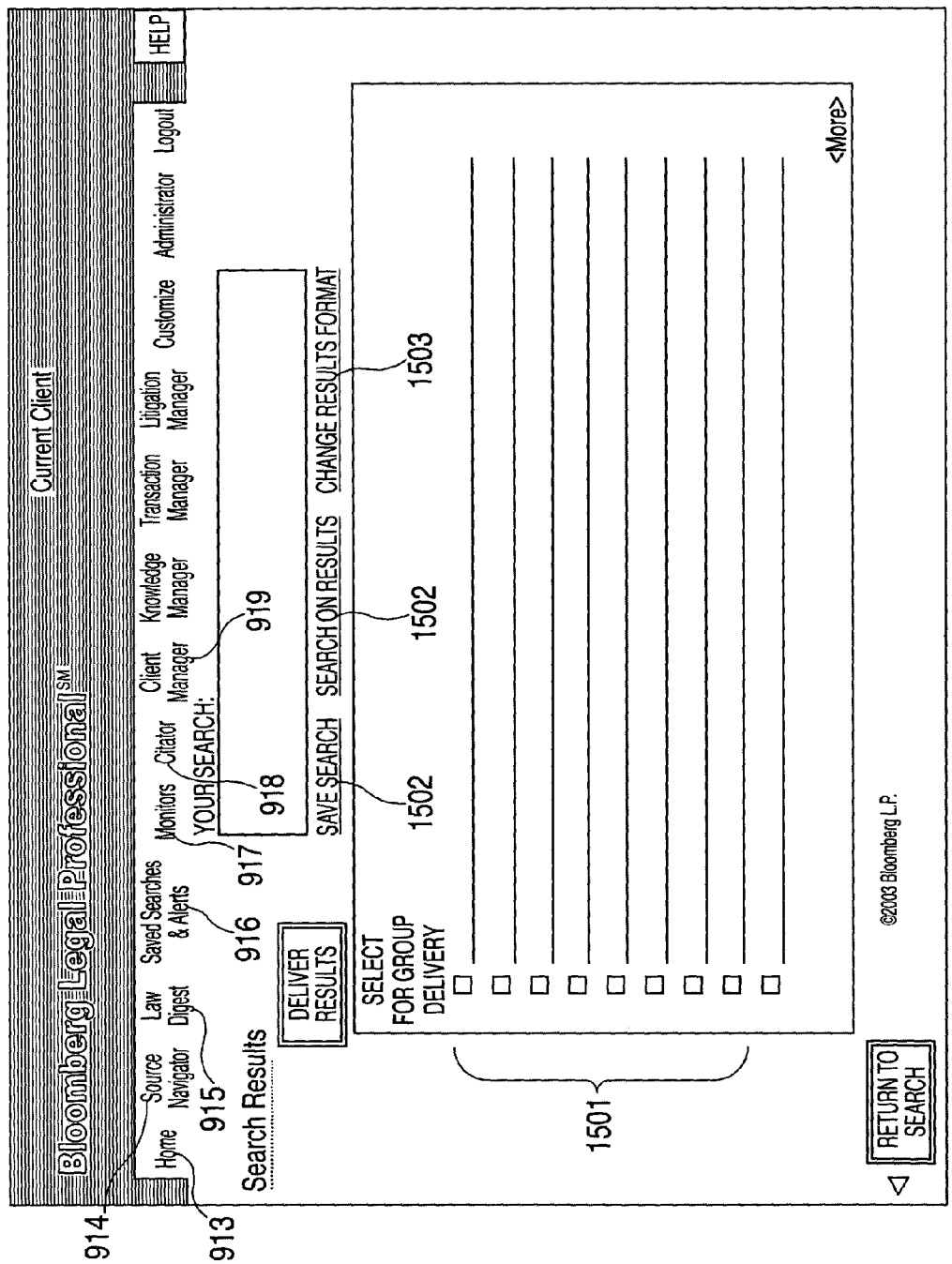

The screen depicted in FIG. 15 provides an interactive means for reviewing results of a search in addition to the live monitoring of fields such as 401-406 of FIGS. 4 and 9. Search results may be presented in summary form or as lists or sets of entire documents or other items. Selection of one or more of items 1501 provides the user with input means to designate one or more groups for delivery to designated users or groups of users. Links 1502, 1503, and 1504 provide means for the user to save the search request logic, to refine a searches based on the results shown, and/or to change the format, e.g., tabulation, of results provided by system 101.

The screen depicted in FIG. 16 provides interactive control capabilities for controlling current awareness displays of search results, as for example as provided in windows 401-406 of FIGS. 4 and 9. The requesting user 150 is provided by items 1601 the option of making the provision of information items identified in response to individual searches or groups of searches active or passive; that is, of suspending or reinstating the automatic searching for new responsive information. Optionally, information identified in response to passive, or suspended requests, may be held by provider system 101 in cache or other memory for later access by the requesting user. Such information may also be held in memory at client system(s) 150. Items 1602 enable the user to elect to receive displayed, printed, or e-mailed results (and/or optional other formats) in the form of groups of headline or other summaries of responsive items. Items 1603 enable the requesting user to set the frequency with which provider 101 checks for new responsive items, in units set by the user in fields 1404 of FIG. 14. For example, depending upon the units set by the user in fields 1404, the frequencies shown in FIG. 16 may be expressed in minutes, weeks, months, etc. Items 1604 enable the user to view lists of associated searches.

Figure 17:
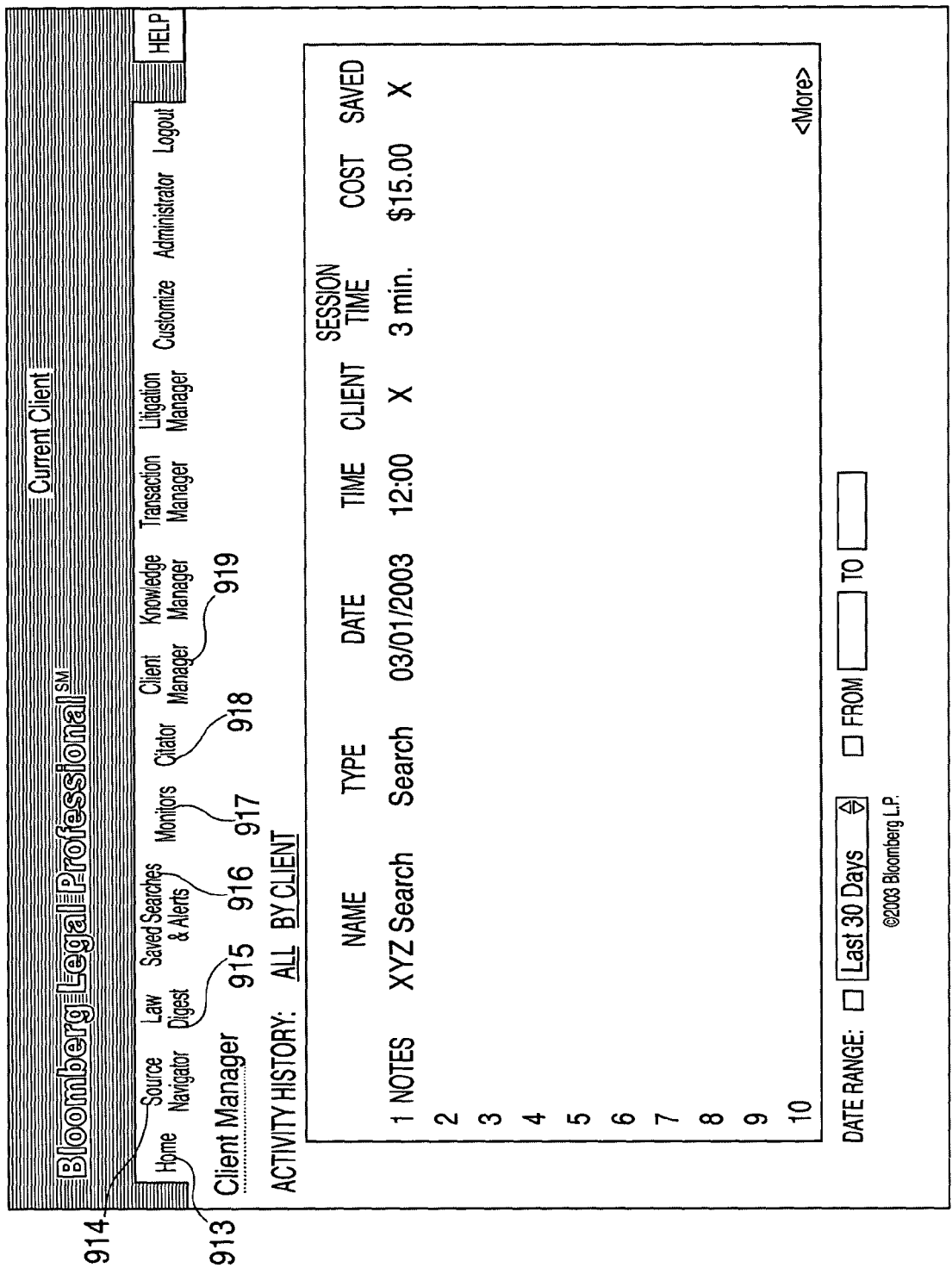

The screen of FIG. 17 provides the user with information related to administrative tasks, such as search times, durations, and costs, as indicated.

Data comprising identifiers to be used in search requests, for implementing the various designations received from requesting users, for example information for tabulating requested information, destination devices for requested information, and recipients of requested information, and the like, are preferably transmitted or otherwise made available by user-accessible terminals 106 to provider system 101, and stored in memory associated with an securely accessible by provider system 101, as for example in one or more of databases 151. Optionally such data resides, or copies of such data reside, on user memories 121, or other memory associated with user terminals 106 and/or client systems 150. Identifiers displayed on interactive screens and in other formats accessible to requesting users for constructing, reviewing, and modifying search requests, etc., may or may not be identical to character strings and other identifiers used by system 101 in accessing databases 121, 151, etc., to identify information responsive to the search requests.

A number of search techniques for identifying data in memory by means of character strings and other identifiers, etc., are well known in the arts, and others will likely be hereafter developed. Any such techniques suitable for the purposes and effects described herein will serve for use by provider 101 and other processors in searching memory according to the invention. Similarly other processing, display functions, and document and other data handling can be accomplished in a wide variety of data processing systems by a wide variety of means now known or hereafter developed, including for example any of a number of widely known display and data processing and programming techniques. The implementation of such search and other data processing techniques will not trouble the programmer of ordinary skill in such arts, once he/she has been made familiar with this disclosure.

For example, it will be understood by those skilled in the art that the systems depicted in FIGS. 3 and 3b and elsewhere are merely examples of many possible system arrangements that may be employed to carry out the invention detailed herein. The systems depicted herein should be viewed as merely illustrative. The systems and software referenced herein include, either explicitly or implicitly, software implemented on computers or other appropriate hardware, including such other intelligent data processing devices having a processor, data storage means, and the ability to support an operating system, with or without user interfaces, for example, file servers, as may be useful in achieving the objectives of this invention.

Software components and applications embodying the invention can be distributed in electronic bit storage on magnetic, optical, bubble, or other media, and optionally in transportable form to be interactive with an electronic reading device, for example, on computer or optical diskettes, or may be distributed over wired or wireless networks for storage by the recipient on such media.

It will further be appreciated that such media-stored software constitutes an electronic customizing machine which can interact with a magnetically or optically cooperative computer-based input device enabling the computer to be customized as a special purpose computer, according to the contents of the software. When so configured, the special-purpose computer device has an enhanced value, especially to the professional users for whom it may be intended.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

I claim:

1. A system for providing legal information comprising associated items of legal information and content, the system comprising:
   at least one computer and a plurality of user terminals which communicate over a network;
   at least one database associated with the at least one computer storing the legal information in association with a plurality of legal topics and a plurality of types of legal information; and
   a computer readable medium or media storing programming that causes the at least one computer to:
      access within the at least one database a plurality of items of legal information responsive to a request received from a user terminal, each item of legal information being associated with one or more respective topic tags and one or more respective type tags, each topic tag identifying a legal topic or subtopic associated with the associated item of legal information and each type tag identifying a type of legal information corresponding to the associated item of legal information;
      cause each item of legal information associated with the accessed information to be provided for display on a display device associated with the user terminal from which the request was received, automatically tabulated by the respective type tags and configured to be selectable at the user terminal to provide a request for display on the display device of the content associated with the selected item;
      automatically and periodically access the at least one database to determine whether new legal information responsive to the request is stored within the at least one database while each item of legal information associated with the previously accessed legal information is provided for display on the display device; and
      if new legal information responsive to the request is stored within the at least one database, provide for display on the display device each item of legal information associated with the new legal information, together with each item of legal information associated with the previously accessed legal information all tabulated by type.

2. A system for providing legal information comprising associated items of legal information and content, the system comprising:
   at least one computer and a plurality of user terminals which communicate over a network;
   at least one database associated with the at least one computer storing the legal information in association with a plurality of legal topics and a plurality of types of legal information; and
   a computer readable medium or media storing programming that causes the at least one computer to:
      access within the at least one database a plurality of items of legal information responsive to a request received from a user terminal, each item of information being associated with one or more respective topic tags and one or more respective type tags, each topic tag identifying a legal topic or subtopic associated with the associated item of legal information and each type tag identifying a type of legal information corresponding to the associated item of legal information;
      cause each item of legal information associated with the accessed information to be provided for display on a display device associated with the user terminal from which the request was received, automatically tabulated by the respective type tags and configured to be selectable at the user terminal to provide a request for display on the display device of the content associated with the selected item;
      automatically and continually access the at least one database to determine whether new legal information responsive to the request is stored within the at least one database while each item of legal information associated with the previously accessed legal information is provided for display on the display device; and
      if new legal information responsive to the request is stored within the at least one database, provide for display on the display device each item of legal information associated with the new legal information, together with each item of legal information associated with the previously accessed legal information all tabulated by type.

3. A method of processing legal information, the method comprising:
   assigning to each of a plurality of documents which each comprises legal information relating to a plurality of legal topics at least one identifier associated with (a) at least one of the legal topics and (b) at least one of a plurality of types of legal information;
   formatting the documents according to a protocol;
   storing the formatted documents in at least one database;
   checking formatted documents for compliance with a document receiving protocol;
   generating a notice of defects automatically upon determination that a checked document does not comply with the protocol;
   using identifiers associated with the stored documents to identify documents within the at least one database responsive to a request received from a user terminal for information related to at least one of the plurality of legal topics; and
   causing legal information associated with the identified documents to be provided for display on the display device, automatically tabulated by type according to the identifiers associated with the respective identified documents.

4. The method of claim 3, comprising automatically performing the assigning and formatting steps on the non-complying document.

5. A method for providing legal information comprising associated items of legal information and content in a system comprising at least one computer and a plurality of user terminals which communicate over a network, and at least one database associated with the at least one computer storing a plurality of items of legal information, each item of legal information being associated with one or more respective topic tags and one or more respective type tags, each topic tag identifying a legal topic or subtopic associated with the associated item of legal information and each type tag identifying a type of legal information corresponding to the associated item of legal information, the method comprising:

the at least one computer accessing within the at least one database legal information responsive to a request from a user terminal;

the at least one computer providing for display on a display device associated with the user terminal from which the request was received each item of legal information associated with the accessed information, automatically tabulated by the respective type tag and configured to be selectable at the user terminal to provide a request for display on the display device of the content associated with the selected item;

the at least one computer providing for display on the display device content associated with a displayed item of legal information in response to selection thereof at the user terminal;

the at least one computer automatically and periodically accessing the at least one database to determine whether new legal information responsive to the request is stored within the at least one database while each item of legal information associated with the previously accessed legal information is provided for display on the display device; and if new legal information responsive to the request is stored within the at least one database, the at least one computer providing for display on the display device each item of legal information associated with the new legal information together with each item of legal information associated with the previously accessed legal information all tabulated by type.

* * * * *